(12) United States Patent
Nagata et al.

(10) Patent No.: US 8,396,639 B2
(45) Date of Patent: Mar. 12, 2013

(54) VEHICLE DECELERATION CONTROLLER THAT INHIBITS WARNING BRAKING DURING PRE-INITIATED VEHICLE DECELERATION

(75) Inventors: Shinichi Nagata, Atsugi (JP); Toshinori Okita, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 711 days.

(21) Appl. No.: 12/227,133

(22) PCT Filed: Jun. 22, 2007

(86) PCT No.: PCT/JP2007/063064
§ 371 (c)(1),
(2), (4) Date: Nov. 7, 2008

(87) PCT Pub. No.: WO2008/001874
PCT Pub. Date: Jan. 3, 2008

(65) Prior Publication Data
US 2009/0128318 A1   May 21, 2009

(30) Foreign Application Priority Data

Jun. 26, 2006  (JP) .................................. 2006-175021

(51) Int. Cl.
*B60T 7/12* (2006.01)
*B60R 2/00* (2006.01)
*G06F 19/00* (2006.01)

(52) U.S. Cl. .............................. 701/70; 701/96; 303/191

(58) Field of Classification Search ................. 701/1, 70, 701/93, 96, 300, 301, 79, 45; 340/901, 904, 340/425.5, 435; 303/191, 193; 180/169
See application file for complete search history.

(56) References Cited

U.S. PATENT DOCUMENTS 6,070,682 A * 6/2000 Isogai et al. .................. 180/167
6,223,118 B1 * 4/2001 Kobayashi et al. ............. 701/96
6,285,945 B1 * 9/2001 Sielagoski et al. ............. 701/96

(Continued)

FOREIGN PATENT DOCUMENTS

JP    A-54-033444    3/1979
JP    A-6-8809       1/1994

(Continued)

OTHER PUBLICATIONS

European Search Report issued on Feb. 4, 2010 in European Application No. 07767851.4.

(Continued)

*Primary Examiner* — Tan Q Nguyen
(74) *Attorney, Agent, or Firm* — Oliff & Berridge, PLC

(57) ABSTRACT

Warning braking is carried out in a situation where the warning braking is needed and a crew can recognize the warning braking. If an obstacle is present ahead of the vehicle, and the driver does not carry out brake operation, and the vehicle may collide with the obstacle, the maximum target deceleration Gbt2max for the warning braking is computed. If automatic travel control is not carried out or if automatic travel control is being carried out and its target deceleration Gbt4 is less than a reference value Gbt4s smaller than the maximum target deceleration Gbt2max, the warning braking is carried out. When the target deceleration Gbt4 for the automatic travel control is larger than the allowable reference value Gbt4s for warning braking, the warning braking is not carried out.

14 Claims, 11 Drawing Sheets

U.S. PATENT DOCUMENTS

| | | | |
|---|---|---|---|
| 6,296,326 B1 * | 10/2001 | Steiner et al. | 303/125 |
| 6,308,796 B1 * | 10/2001 | Fuchs et al. | 180/169 |
| 6,324,465 B1 * | 11/2001 | Teramura et al. | 701/96 |
| 6,327,536 B1 * | 12/2001 | Tsuji et al. | 701/301 |
| 6,418,370 B1 * | 7/2002 | Isogai et al. | 701/96 |
| 6,470,986 B2 * | 10/2002 | Fuchs et al. | 180/169 |
| 6,496,771 B2 * | 12/2002 | Hattori et al. | 701/96 |
| 6,507,781 B2 * | 1/2003 | Maruko et al. | 701/70 |
| 6,517,172 B1 * | 2/2003 | Bond et al. | 303/193 |
| 6,523,912 B1 * | 2/2003 | Bond et al. | 303/9 |
| 6,604,042 B2 * | 8/2003 | Maruko et al. | 701/96 |
| 6,889,140 B2 * | 5/2005 | Isogai et al. | 701/301 |
| 7,259,661 B2 * | 8/2007 | Kitterer et al. | 340/436 |
| 7,425,043 B2 * | 9/2008 | Doerr et al. | 303/193 |
| 2004/0085197 A1 * | 5/2004 | Watanabe et al. | 340/435 |
| 2004/0122578 A1 | 6/2004 | Isaji et al. | |
| 2004/0193347 A1 * | 9/2004 | Harumoto et al. | 701/45 |
| 2005/0125134 A1 * | 6/2005 | Iwatsuki et al. | 701/70 |
| 2005/0218718 A1 * | 10/2005 | Iwatsuki et al. | 303/177 |
| 2006/0097570 A1 | 5/2006 | Doerr et al. | |
| 2006/0290202 A1 * | 12/2006 | Shibata et al. | 303/165 |

FOREIGN PATENT DOCUMENTS

| | | |
|---|---|---|
| JP | A-2002-347546 | 12/2002 |
| JP | A-2003-141697 | 5/2003 |
| JP | A-2004-189075 | 7/2004 |
| JP | A-2004-224309 | 8/2004 |
| JP | A-2004-291667 | 10/2004 |
| JP | A-2005-031967 | 2/2005 |
| JP | A-2005-186936 | 7/2005 |
| JP | A-2006-004242 | 1/2006 |
| JP | A-2006-500270 | 1/2006 |
| WO | WO 2004/028847 A1 | 4/2004 |

OTHER PUBLICATIONS

Office Action for priority Japanese Patent Application No. 2006-175021, dated Mar. 22, 2011 (w/ partial English translation).

Japanese Office Action dated Aug. 10, 2010 in Japanese Patent Application No. 2006-175021 (with partial translation).

* cited by examiner

VEHICLE DECELERATION CONTROLLER THAT INHIBITS WARNING BRAKING DURING PRE-INITIATED VEHICLE DECELERATION

TECHNICAL FIELD

The present invention relates to a deceleration controller for a vehicle, and more particularly, to a deceleration controller for a vehicle which performs warning braking for issuing a warning to a crew of the vehicle.

BACKGROUND ART

As described in, for example, Japanese Patent Application Laid-Open (kokai) No. 2005-31967, a known deceleration controller for a vehicle, such as an automobile, performs, as a warning to a driver, warning braking for decelerating the vehicle by means of braking when deceleration is needed from the viewpoint of a risk of colliding with a front obstacle and securing of safety. According to such a deceleration controller, in a situation where deceleration is needed from the viewpoint of a risk of colliding with a front obstacle and securing of safety, a warning which indicates the necessity of deceleration can be issued to a driver by means of deceleration of the vehicle.

In general, the warning braking is performed in a situation where the driver does not carry out brake operation even though the vehicle is likely to collide with a front obstacle. Such warning braking is performed by decelerating the vehicle by means of braking in order to issue a warning to the driver. Therefore, when deceleration of the vehicle has already been started and the degree of the deceleration is large, the warning braking is not effective. Further, when the warning braking is performed to decelerate the vehicle which is already in a decelerated state, a change in the deceleration of the vehicle is small, and a crew of the vehicle cannot recognize the warning braking in some cases.

In particular, in some cases, the vehicle is decelerated in response to a deceleration request associated with travel control of the vehicle, such as cruise control, and the difference between a deceleration of the vehicle achieved by the warning braking and the deceleration achieved in response to the deceleration request is small, even thought the former deceleration is greater than the latter deceleration. In such a case, even through the crew of the vehicle can recognize a change in the deceleration of the vehicle due to execution of the warning braking, the crew recognizes it as a mere change in deceleration during travel of the vehicle, not as a warning. Therefore, the warning braking causes the crew of the vehicle to feel an unnatural sensation.

DISCLOSURE OF THE INVENTION

A major object of the present invention is to determine, on the basis of a deceleration state of a vehicle, whether or not warning braking is to be performed, to thereby reliably carry out the warning braking in a situation where the warning braking is needed and a crew of the vehicle can recognize the warning braking, and prevent the crew of the vehicle from feeling an unnatural sensation due to the warning braking in a situation where the warning braking is needed but the crew of the vehicle cannot effectively recognize the warning braking.

According to the present invention, there is provided a deceleration controller for a vehicle which comprises warning braking means for performing warning braking so as to issue a warning to a crew of the vehicle; and travel control means for decelerating the vehicle in response to a deceleration request associated with travel control of the vehicle, wherein, even when the warning braking is needed, the warning braking is not performed if the vehicle is being decelerated by the travel control means and the deceleration of the vehicle is equal to or greater than a reference value. Alternatively, there is provided a deceleration controller for a vehicle which comprises warning braking means for performing warning braking so as to issue a warning to a crew of the vehicle; and travel control means for decelerating the vehicle in response to a deceleration request associated with travel control of the vehicle, wherein the warning braking means computes a target deceleration for the warning braking and decelerates the vehicle such that the deceleration of the vehicle coincides with the target deceleration, and wherein, even when the warning braking is needed, the warning braking is not performed if the vehicle is being decelerated by the travel control means and the target deceleration is equal to or less than a sum of the deceleration of the vehicle and a predetermined value.

According to the former configuration, even when the warning braking is needed, the warning braking is not performed if the vehicle is being decelerated by the travel control means and the deceleration of the vehicle is equal to or greater than the reference value. Therefore, in a situation where the warning braking is needed, the following advantageous operations can be realized. When the deceleration of the vehicle is less than the reference value although the vehicle is being decelerated by the travel control means, the warning braking can be reliably performed to thereby issue a warning to the crew of the vehicle. On the other hand, when the vehicle is being decelerated by the travel control means, the deceleration of the vehicle is equal to or greater than the reference value, and it is difficult for the crew of the vehicle to effectively recognize the warning braking, it is possible to reliably prevent the crew of the vehicle from feeling an unnatural sensation due to the warning braking.

According to the latter configuration, even when the warning braking is needed, the warning braking is not performed if the vehicle is being decelerated by the travel control means and the target deceleration of the warning braking means is equal to or less than the sum of the deceleration of the vehicle and the predetermined value. Therefore, in a situation where the warning braking is needed, the following advantageous operations can be realized. When the target deceleration of the warning braking means is greater than the sum of the deceleration of the vehicle and the predetermined value although the vehicle is being decelerated by the travel control means, the warning braking can be reliably performed to thereby issue a warning to the crew of the vehicle. On the other hand, when the vehicle is being decelerated by the travel control means, the target deceleration of the warning braking means is equal to or less than the sum of the deceleration of the vehicle and the predetermined value, and it is difficult for the crew of the vehicle to effectively recognize the warning braking, it is possible to reliably prevent the crew of the vehicle from feeling an unnatural sensation due to the warning braking.

In the above-described configuration, the deceleration controller may be configured to start the warning braking upon detection of a situation where the warning braking is needed and the deceleration of the vehicle is less than the reference value.

By virtue of this configuration, the warning braking is started upon detection of a situation where the warning braking is needed and the deceleration of the vehicle is less than the reference value. Therefore, the warning braking can be started when the deceleration of the vehicle becomes less than the reference value in a situation where the warning braking is needed, or when the warning braking becomes necessary in a situation where the deceleration of the vehicle is less than the reference value. In contrast, even when the warning braking is needed, it is possible to reliably prevent the warning braking from starting if the deceleration of the vehicle is equal to or greater than the reference value.

In the above-described configuration, the deceleration controller may be configured to continue the warning braking until a predetermined termination condition is satisfied, even if the deceleration of the vehicle becomes equal to or greater than the reference value in a situation where the warning braking is being performed.

By virtue of this configuration, the warning braking is continued until the predetermined termination condition is satisfied, even if the deceleration of the vehicle becomes equal to or greater than the reference value in a situation where the warning braking is being performed. Therefore, unlike the case where the warning braking is immediately terminated when the deceleration of the vehicle becomes equal to or greater than the reference value in a situation where the warning braking is being performed, it is possible to prevent the continued time of the warning braking from becoming short, which would otherwise result in a failure to effectively perform the warning braking. Thus, it becomes possible to reliably and effectively issue a warning by means of the warning braking to the crew of the vehicle.

In the above-described configuration, when the vehicle speed is high, the reference value may be large, as compared with the case where the vehicle speed is low.

In general, when the vehicle speed is high, the crew of the vehicle sensitively feels a change in deceleration, as compared with the case where the vehicle speed is low. Therefore, when the vehicle speed is high, it is preferred to perform the warning braking, even if a change in deceleration due to the warning braking is small, unlike the case where the vehicle speed is low. In contrast, when the vehicle speed is low, it becomes difficult for the crew of the vehicle to feel a change in deceleration, as compared with the case where the vehicle speed is high, and the crew becomes likely to feel an unnatural sensation due to the warning braking. Therefore, when the vehicle speed is low, it is preferred not to perform the warning braking which causes a small change in deceleration, unlike the case where the vehicle speed is high.

By virtue of the above-described configuration, when the vehicle speed is high, the reference value is large, as compared with the case where the vehicle speed is low; i.e., when the vehicle speed is low, the reference value is small, as compared with the case where the vehicle speed is high. Therefore, in a situation where the vehicle speed is low and it becomes difficult for the crew of the vehicle to feel a change in deceleration, the reference value is made smaller so as to make it difficult to perform the warning braking. Thus, it is possible to effectively prevent the crew of the vehicle from feeling an unnatural sensation due to performance of less effective warning braking. In addition, in a situation where the vehicle speed is high and the crew of the vehicle sensitively feels a change in deceleration, the reference value is made larger so as to make it easy to perform the warning braking. Thus, it is possible to reliably issue a warning by means of the warning braking to the crew of the vehicle.

In the above-described configuration, the travel control means may be configured to calculate a target deceleration for the travel control of the vehicle and decelerate the vehicle such that the deceleration of the vehicle coincides with the target deceleration, and the warning braking means may be configured to terminate the warning braking when the target deceleration for the travel control becomes greater than the deceleration of the vehicle in a situation where the warning braking is being performed.

By virtue of this configuration, the warning braking is terminated when the target deceleration for the travel control becomes greater than the deceleration of the vehicle in a situation where the warning braking is being performed. Therefore, it is possible to issue a warning to the driver by means of the warning braking until the warning braking is terminated. In addition, it is possible to reliably prevent the travel control of the vehicle by the travel control means from being hindered by the continued warning braking.

In the above-described configuration, the deceleration controller may be configured to start the warning braking upon detection of a situation where the warning braking is needed and the target deceleration is the greater than the sum of the deceleration of the vehicle and the predetermined value.

By virtue of this configuration, the warning braking is started upon detection of a situation where the warning braking is needed and the target deceleration for the warning braking is greater than the sum of the deceleration of the vehicle and the predetermined value. Therefore, the warning braking can be started when the target deceleration for the warning braking becomes greater than the sum of the deceleration of the vehicle and the predetermined value in a situation where the warning braking is needed, or when the warning braking becomes necessary in a situation where the target deceleration for the warning braking is greater than the sum of the deceleration of the vehicle and the predetermined value. In contrast, even when the warning braking is needed, it is possible to reliably prevent the warning braking from starting if the target deceleration for the warning braking is equal to or less than the sum of the deceleration of the vehicle and the predetermined value.

In the above-described configuration, the deceleration controller may be configured to continue the warning braking until a predetermined termination condition is satisfied, even if the target deceleration for the warning braking becomes equal to or less than the sum of the deceleration of the vehicle and the predetermined value.

By virtue of this configuration, the warning braking is continued until the predetermined termination condition is satisfied, even if the target deceleration for the warning braking becomes equal to or less than the sum of the deceleration of the vehicle and the predetermined value. Therefore, unlike the case where the warning braking is immediately terminated when the target deceleration for the warning braking becomes equal to or less than the sum of the deceleration of the vehicle and the predetermined value in a situation where the warning braking is being performed, it is possible to prevent the continued time of the warning braking from becoming short, which would otherwise result in a failure to effectively perform the warning braking. Thus, it becomes possible to reliably and effectively issue a warning by means of the warning braking to the crew of the vehicle.

In the above-described configuration, when the deceleration of the vehicle is large, the maximum value of the target deceleration may be large, as compared with the case where the deceleration of the vehicle is small.

In general, even in the case where a change in deceleration of the vehicle is the same, when the deceleration of the vehicle is small, it is easy for the crew of the vehicle to feel a change in deceleration, as compared with the case where the deceleration of the vehicle is large; and when the deceleration of the vehicle speed is large, it is difficult for the crew of the vehicle to feel a change in deceleration, as compared with the case where the deceleration of the vehicle is small. Therefore, a deceleration of the vehicle which is added by means of the warning braking in a situation where the vehicle is being decelerated by the travel control means is preferably determined such that when the deceleration of the vehicle is small, the deceleration added by means of the warning braking is small, as compared with the case where the deceleration of the vehicle is large, and when the deceleration of the vehicle is large, the deceleration added by means of the warning braking is larger, as compared with the case where the deceleration of the vehicle is small.

By virtue of the above-described configuration, when the deceleration of the vehicle is large, the maximum value of the target deceleration for the warning braking is large, as compared with the case where the deceleration of the vehicle is small; i.e., when the deceleration of the vehicle is small, the maximum value of the target deceleration for the warning braking is small, as compared with the case where the deceleration of the vehicle is large. Therefore, it is possible to prevent the deceleration of the vehicle by means of the warning braking from becoming excessively large in a situation where the deceleration of the vehicle is small. In addition, it is possible to effectively issue a warning by means of the warning braking to the crew of the driver by sufficiently changing the deceleration of the vehicle in a situation where the deceleration of the vehicle is large.

In the above-described configuration, when the vehicle speed is high, the maximum value of the target deceleration may be small, as compared with the case where the vehicle speed is low.

In general, when the vehicle speed is high, the crew of the vehicle sensitively feels a change in deceleration, as compared with the case where the vehicle speed is low. Therefore, when the vehicle speed is high, a change in deceleration by means of the warning braking may be small, as compared with the case where the vehicle speed is low. In contrast, when the vehicle speed is low, it becomes difficult for the crew of the vehicle to feel a change in deceleration, as compared with the case where the vehicle speed is high. Therefore, when the vehicle speed is low, it is preferred that the change in deceleration by means of the warning braking is large, as compared with the case where the vehicle speed is high.

By virtue of the above-described configuration, when the vehicle speed is high, the maximum value of the target deceleration for the warning braking is large, as compared with the case where the vehicle speed is low; i.e., when the vehicle speed is low, the maximum value of the target deceleration for the warning braking is small, as compared with the case where the vehicle speed is high. Therefore, in a situation where the vehicle speed is low, it is possible to sufficiently decelerate the vehicle to thereby effectively issue a warning by means of the warning braking to the crew of the driver. In addition, in a situation where the vehicle speed is high, it is possible to effectively prevent the deceleration of the vehicle by means of the warning braking from becoming excessively large.

In the above-described configuration, when the vehicle speed is high, the predetermined value may be small, as compared with the case where the vehicle speed is low.

By virtue of the above-described configuration, when the vehicle speed is high, the predetermined value is small, as compared with the case where the vehicle speed is low; i.e., when the vehicle speed is low, the predetermined value is large, as compared with the case where the vehicle speed is high. Therefore, in a situation where the vehicle speed is low, it becomes difficult for the driver to feel a change in deceleration, and thus, the driver is likely to feel an unnatural sensation due to the warning braking, it becomes possible to make it difficult to perform the warning braking. In addition, in a situation where the vehicle speed is high, it becomes easy for the driver to feel a change in deceleration, and thus, the driver easily recognizes the warning braking, it becomes possible to reliably and effectively issue a warning by means of the warning braking to the crew of the vehicle.

In the above-described configuration, the travel control means may be configured to calculate a target deceleration for the travel control of the vehicle and decelerate the vehicle such that the deceleration of the vehicle coincides with the target deceleration, and the warning braking means may be configured to terminate the warning braking when the target deceleration for the travel control becomes greater than the target deceleration for the warning braking in a situation where the warning braking is being performed.

By virtue of this configuration, the warning braking is terminated when the target deceleration for the travel control becomes greater than the target deceleration for the warning braking in a situation where the warning braking is being performed. Therefore, it is possible to issue a warning to the driver by means of the warning braking until the warning braking is terminated. In addition, it is possible to reliably prevent the travel control of the vehicle by the travel control means from being hindered by the continued warning braking.

In the above-described configuration, the deceleration request associated with the travel control of the vehicle may be a deceleration request for automatically decelerating the vehicle, irrespective of driving operation by the driver, so as to support the driving of the vehicle by the driver.

By virtue of this configuration, the following advantageous operations can be realized even in the case where there is provided the deceleration request for automatically decelerating the vehicle, irrespective of driving operation by the driver, so as to support the driving of the vehicle by the driver. That is, when the crew of the vehicle can effectively recognize the warning braking, it is possible to reliably perform the warning braking, to thereby issue a warning to the crew of the vehicle; and when it is difficult for the crew of the vehicle to effectively recognize the warning braking, it is possible to reliably prevent the crew of the vehicle from feeling an unnatural sensation due to the warning braking.

In the above-described configuration, the warning braking means may be configured to determine that the warning braking is necessary, when the vehicle is likely to collide with a front obstacle and the driver does not carry out brake operation.

In the above-described configuration, the warning braking means may include means for detecting that the driver is looking aside, and may be configured to determine that the warning braking is necessary, when the vehicle is likely to collide with a front obstacle, the driver does not carry out brake operation, and the driver is looking aside.

In the above-described configuration, the warning braking means may be configured such that, in the case where the vehicle is not decelerated by the travel control means, the warning braking means determines that a warning braking start condition is satisfied when it determines that the warning braking becomes necessary, and starts the warning braking.

In the above-described configuration, the warning braking means may be configured such that, in the case where the vehicle is being decelerated by the travel control means, the warning braking means determines that a warning braking start condition is satisfied when it determines that the warning braking becomes necessary in a situation where the deceleration of the vehicle is less than the reference value, or when the deceleration of the vehicle becomes less than the reference value in a state where the warning braking is needed, and starts the warning braking.

In the above-described configuration, the warning braking means may be configured such that, in the case where the vehicle is being decelerated by the travel control means, the warning braking means determines that a warning braking start condition is satisfied when it determines that the warning braking becomes necessary in a situation where the target deceleration for the warning braking is greater than the sum of the deceleration of the vehicle and the predetermined value, or when the target deceleration for the warning braking becomes greater than the sum of the deceleration of the vehicle and the predetermined value in a state where the warning braking is needed, and starts the warning braking.

In the above-described configuration, the warning braking means may be configured such that, when the warning braking start condition is satisfied, the warning braking means performs the warning braking over a preset period of time from that point in time.

In the above-described configuration, the travel control means may be configured to calculate a target deceleration for the travel control of the vehicle and decelerate the vehicle such that the deceleration of the vehicle coincides with the target deceleration, and the warning braking means may be configured not to perform the warning braking when the vehicle is being decelerated by the travel control means and the target deceleration for the travel control is equal to or greater than a reference value.

In the above-described configuration, the warning braking means may be configured to terminate the warning braking when the target deceleration for the travel control becomes higher than the target deceleration for the warning braking in a situation where the warning braking is being performed.

In the above-described configuration, the warning braking means may be configured such that when the warning braking is performed, the warning braking means gradually increases the deceleration of the vehicle to the maximum value of the target deceleration for the warning braking, maintains the deceleration of the vehicle at the maximum value of the target deceleration for the warning braking until a preset period of time elapses from a point in time at which the warning braking start condition is satisfied, and gradually decreases the deceleration of the vehicle.

In the above-described configuration, the warning braking means may be configured to increase an increase rate, at which the deceleration of the vehicle is gradually increased, as the deceleration of the vehicle by the travel control of the vehicle at the time of start of the warning braking increases.

In the above-described configuration, the warning braking means may be configured such that, even when the warning braking is needed, the warning braking means does not perform the warning braking if the vehicle is being decelerated by the travel control means and the target deceleration for the warning braking is equal to or less than the sum of the target deceleration for the travel control and the predetermined value.

In the above-described configuration, the deceleration request associated with the travel control of the vehicle may be a deceleration request for causing the vehicle to travel in a predetermined speed region, or a deceleration request for controlling an inter-vehicle distance between the vehicle and another vehicle ahead of the vehicle.

BEST MODE FOR CARRYING OUT THE INVENTION

Below, a preferred embodiment of a vehicle deceleration controller according to the present invention will be described in detail with reference to the accompanying drawings.

First Embodiment

Figure 1:
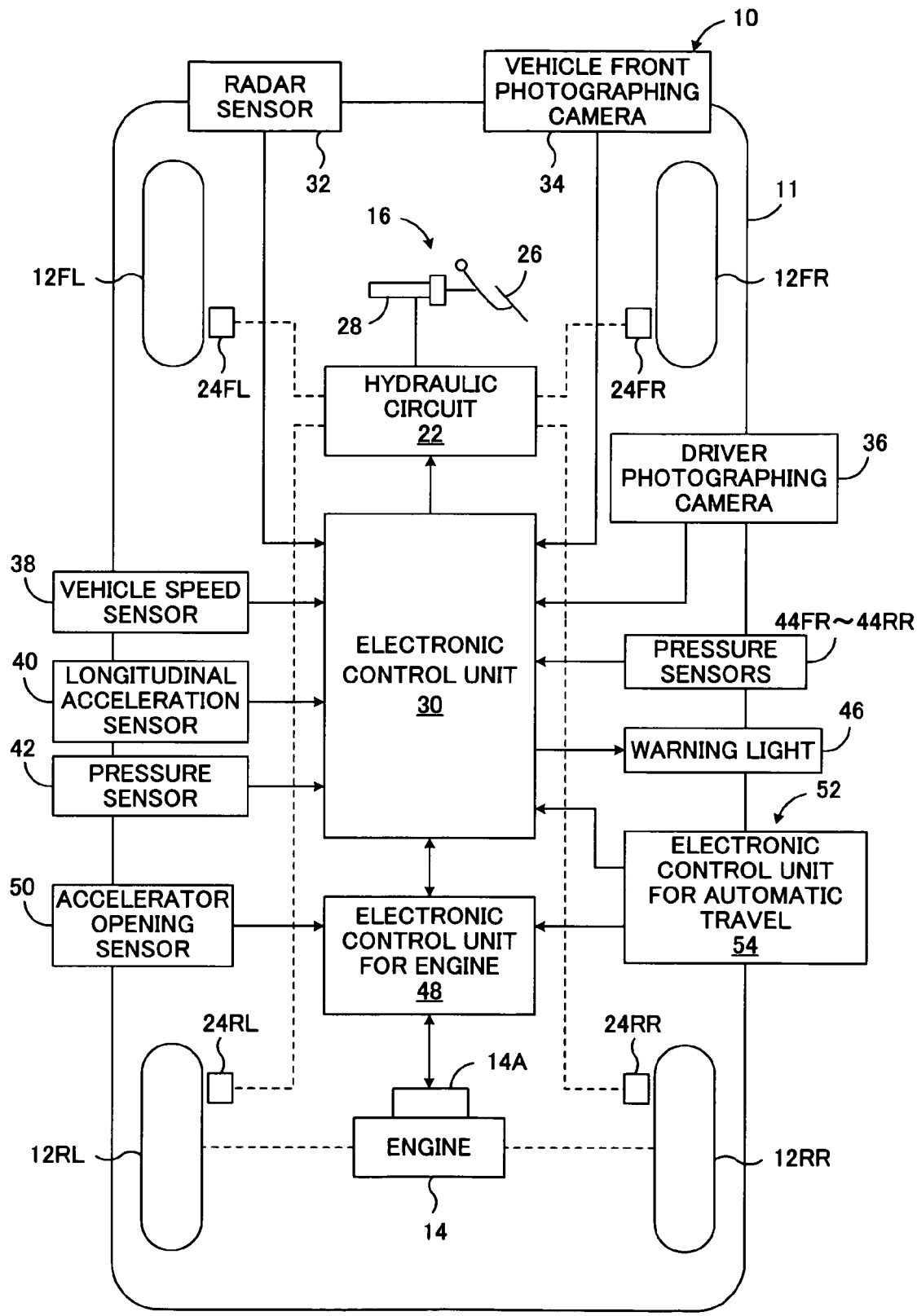
FIG. 1 is a schematic diagram showing one embodiment of a deceleration controller according to the present invention.

FIG. 1 is a schematic diagram showing a first embodiment of a braking and driving force controller of a vehicle according to the present invention, the controller being applied to a four-wheel drive vehicle of an in-wheel motor type.

FIG. 1 is a schematic diagram showing one embodiment of a deceleration controller according to the present invention.

A deceleration controller 10 is mounted on a vehicle 11. The vehicle 11 is a four-wheel automobile, including a right front wheel 12FR, a left front wheel 12FL, a right rear wheel 12RR, and a left rear wheel 12RL. The vehicle 11 also includes an engine 14 that serves as drive source and a braking apparatus 16 that generates braking force. The engine 14 includes a throttle valve actuator 14A for driving a throttle valve thereof. The braking apparatus 16 includes a hydraulic circuit 22, a wheel cylinder 24FR for the right front wheel, a wheel cylinder 24FL for the left front wheel, a wheel cylinder 24RR for the right rear wheel, a wheel cylinder 24RL for the left rear wheel, a brake pedal 26, and a master cylinder 28.

The right and left front wheels 12FR, 12FL, which are steerable wheels, are steered by an unillustrated steering apparatus of a rack and pinion type via right and left tie rods, respectively. The steering apparatus is driven in response to steering operation of a steering wheel by a driver.

The deceleration controller 10 also includes an electronic control unit 30 (hereinafter referred to as ECU 30), a radar sensor 32, a vehicle front photographing camera 34, a driver photographing camera 36, a vehicle speed sensor 38, a longitudinal acceleration sensor 40, a pressure sensor 42 provided on the master cylinder 28, pressure sensors 44FR to 44RL provided for the wheel cylinders 24FR to 24RL, an accelerator opening sensor 50, and a warning light 46.

The ECU 30 is a micro computer including a CPU, a ROM for storing in advance maps (look-up tables) and programs to be executed by the CPU, a RAM in which the CPU temporarily stores data as necessary, a back-up RAM for storing data when the power is ON and retaining the stored data even when the power is interrupted, an interface including an AD converter, etc. These components are connected with one another.

The ECU 30 is connected to the radar sensor 32, the vehicle front photographing camera 34, the driver photographing camera 36, the vehicle speed sensor 38, the longitudinal acceleration sensor 40, the pressure sensor 42, and the pressure sensors 44FR to 44RL. The ECU 30 supplies signals from the individual sensors and cameras to the CPU. The ECU 30 is also connected to the warning light 46. The ECU 30 sends a signal to the warning light 46 in accordance with an instruction from the CPU, to thereby blink or lit the warning light 46.

The master cylinder 28 is driven in accordance with operation of the brake pedal 26 by the driver. The pressure sensor 42 detects pressure in the master cylinder 28, that is, master cylinder pressure Pm. Meanwhile, the pressure sensors 44FR to 44RL detect pressures Pfr, Pfl, Prr, Prl in the respective wheel cylinders 24FR to 24RL, as brake pressures of the respective wheels.

The hydraulic circuit 22 includes an oil reservoir, an oil pump, various electromagnetic valves, etc., which are not illustrated. The hydraulic circuit 22 can change brake pressures in the individual wheel cylinders. The ECU 30 is connected to the electromagnetic valves provided in the hydraulic circuit 22. The ECU 30 sends drive signals to the electromagnetic valves in accordance with instructions from the CPU, to thereby control the braking forces of the individual wheels by controlling the brake pressures of the individual wheel cylinders.

The radar sensor 32, which is installed in the front portion of the vehicle 11, is a millimeter wave radar which emits millimeter wave as detection wave to an area ahead of the vehicle. The radar sensor 32 detects an obstacle, such as another vehicle or a street sign, ahead of the vehicle, detects a relative distance Lre and a relative speed Vre between the obstacle and the vehicle 11, and sends the detected values to the ECU 30 as signals (see, for example, Japanese Patent Application Laid-Open (kokai) No. 2005-31967).

The vehicle front photographing camera 34 includes two CCD cameras which are installed at the left and right sides, respectively, of the front portion of the vehicle 11 for photographing an area ahead of the vehicle. The vehicle front photographing camera 34 recognizes the obstacle detected by the radar sensor 32 as an image data, detects a relative position of the obstacle in relation to the vehicle and a size of the obstacle more accurately by use of parallax of the two cameras, and sends the detected values to the ECU 30 as signals.

The driver photographing camera 36 is a CCD camera which is, for example, installed on a steering column or a dash panel of the vehicle 11. The camera 36 photographs the face of the driver, and sends the image data to the ECU 30 as signals. The CPU of the ECU 30 detects the direction of the face of the driver by processing the acquired image data, and determines whether or not the driver is looking aside.

The vehicle speed sensor 38, which is installed at a predetermined place of the vehicle 11, detects traveling speed of the vehicle 11 as vehicle speed V, and sends a signal representing the vehicle speed V to the ECU 30. The longitudinal acceleration sensor 40, which is installed at a predetermined place of the vehicle 11, detects longitudinal acceleration Gx of the vehicle 11 based on force acting on the vehicle 11 in the longitudinal direction, and sends a signal representing the longitudinal acceleration Gx to the ECU 30.

The ECU 30 determines whether or not an obstacle is present ahead of the vehicle 11 in the traveling direction thereof based on signals from the radar sensor 32 and the vehicle front photographing camera 34. Based on the determination result, the ECU 30 performs, as necessary, two types of obstacle-related automatic braking in accordance with the circumstance: warning braking for notifying the driver that an obstacle is present ahead of the vehicle in the traveling direction thereof; and damage reduction braking for avoiding collision with the obstacle and reducing damage.

In particular, when the driver does not carry out brake operation and is looking aside in a state where the vehicle may collide with an obstacle present ahead of the vehicle in the traveling direction thereof, the ECU 30 first determines that the warning braking is needed to notify the driver that an obstacle is present ahead of the vehicle in the traveling direction thereof, and performs the warning braking. If despite the warning braking the driver does not carry out brake operation or steering operation for avoiding collision and thus the vehicle becomes more likely to collide with the obstacle, the ECU 30 performs the damage reduction braking. On the contrary, if the driver carries out brake operation or steering operation for avoiding collision in response to the caution by means of the warning braking and the vehicle becomes unlikely to collide with the obstacle, the ECU 30 does not perform the damage reduction braking.

The vehicle 11 also includes an electronic control unit 48 for controlling the engine (hereinafter referred to as ECU 48). The ECU 48 is connected to the throttle valve actuator 14A and the accelerator opening sensor 50. The ECU 48 computes a target opening of an unillustrated throttle valve from an accelerator opening $\phi$ which is generally detected by the accelerator opening sensor 50. The ECU 48 sends a throttle valve drive signal to the throttle valve actuator 14A in accordance with an instruction from the CPU, and controls the opening of the throttle valve so that it coincides with the target opening, to thereby control the output of the engine 14 in accordance with the accelerator opening $\phi$.

The vehicle 11 also has an automatic travel controller 52. When a switch for the automatic travel control (not shown in FIG. 1), which is operated by the driver, is in the on state, an electronic control unit 54 (hereinafter referred to as ECU 54) of the automatic travel controller 52 computes a target acceleration Gxt of the vehicle for supporting the driver's driving in a state where the driver does not carry out acceleration/deceleration operation. If the target acceleration Gxt assumes a positive value, the ECU 54 sends a signal representing the target acceleration Gxt for the automatic travel control to the ECU 48. The ECU 48 controls the output of the engine 14 so that the vehicle acceleration Gx coincides with the target acceleration Gxt (an acceleration control mode).

On the contrary, if the target acceleration Gxt assumes a negative value, which represents deceleration, the ECU 54 outputs an engine output decrease request signal to the ECU 48, to thereby decrease the output of the engine 14. At the same time, the ECU 54 sends a signal representing a target deceleration Gbt4 (=−Gxt+e) for the automatic travel control to the ECU 30, where "e" represents the vehicle deceleration by means of engine brake. Next, the ECU 30 controls the braking forces of the individual wheels by means of the braking apparatus 16 so that the vehicle acceleration Gx coincides with a target deceleration −Gxt (a deceleration control mode).

Notably, the automatic travel control may be any automatic travel control known in the present technical field, for automatically accelerating and decelerating the vehicle, as necessary, to support the driver's driving irrespective of driving operation by the driver, such as automatic cruise control and inter-vehicular distance control. The automatic cruise control controls the vehicle to travel at a target vehicle speed (in a predetermined vehicle speed range including the target vehicle speed) set by the driver. The inter-vehicular distance control maintains at least a predetermined distance between the vehicle and a front vehicle.

When the automatic travel control is the inter-vehicular distance control, in general, the vehicle does not become excessively closer to the front vehicle, and therefore, the travel controller according to the embodiment does not perform the warning braking. However, when a third vehicle has changed lanes from the adjacent driving lane into a space between the vehicle and the front vehicle, the distance between the vehicle and the third vehicle is small, and thus the warning braking is needed. Accordingly, in some cases, the travel controller according to the embodiment effectively functions even if the automatic travel control is the inter-vehicular distance control.

The ECU 30 calculates a predicted collision time Ta (a margin of time from the current time point to a time point at which the vehicle collides with the obstacle) by dividing the relative distance Lre between the vehicle and the obstacle by the relative speed Vre between the vehicle and the obstacle, and determines whether or not to execute the warning braking and the damage reduction braking based on the predicted collision time Ta.

In particular, according to the illustrated embodiment, if the predicted collision time Ta is equal to or smaller than a warning braking start reference value Ta1 (a positive constant), and therefore if it is determined that the driver does not carry out brake operation and the driver is looking aside, the ECU 30 determines that the warning braking is needed. The ECU 30 then starts the warning braking, if the automatic travel control is performed in the acceleration control mode or the automatic travel control is not performed when the ECU 30 determines that the warning braking is needed.

Figure 2:
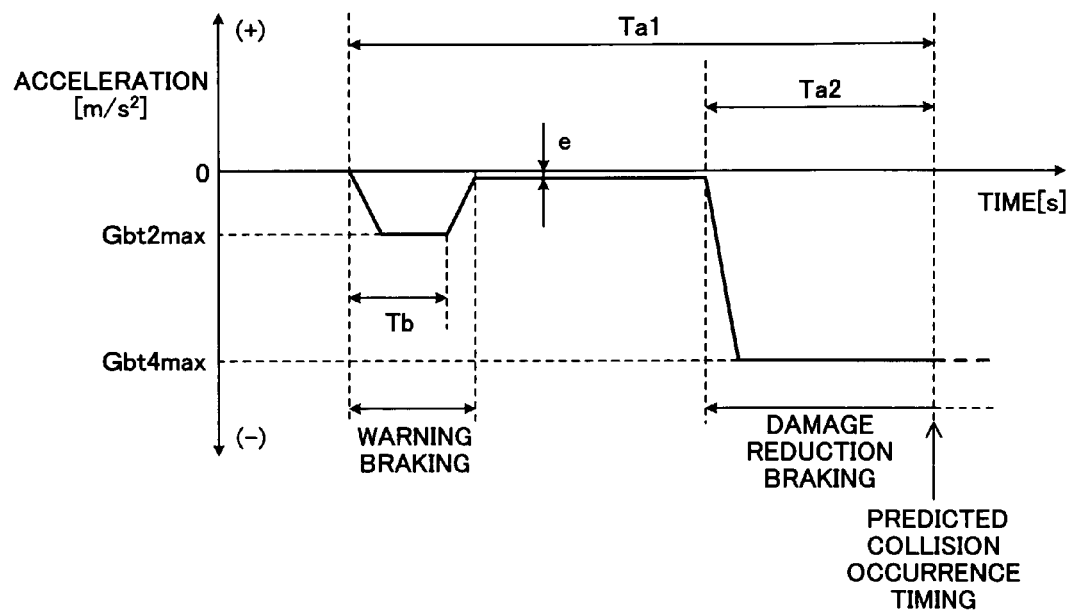
FIG. 2 is a time chart showing warning braking and damage reduction braking performed by the deceleration controller according to the embodiment.

In the following description, the target deceleration for the warning braking will be referred to as a second target deceleration Gbt2. As illustrated in FIG. 2, the target deceleration Gbt2 for the warning braking is set: first to gradually increase by $\Delta$Gb in each cycle until it reaches the maximum target deceleration Gbt2max when a warning braking start condition is satisfied; next to be maintained at the maximum target deceleration Gbt2max until an elapsed time Tb from the start of the warning braking reaches a predetermined value Tbe (a positive constant); and thereafter to decrease at a predetermined decrease rate.

In this case, the per-cycle increase amount $\Delta$Gb is variably set in accordance with the vehicle speed V, such that it decreases as the vehicle speed V increases. In addition, the maximum target deceleration Gbt2max is variably set in accordance with the target deceleration Gbt4 for the automatic travel control at the start of the warning braking, and the vehicle speed V, such that it increases as the target deceleration Gbt4 for the automatic travel control increases, and decreases as the vehicle speed V increases.

When the automatic travel control is performed in the deceleration control mode, the warning braking is started when the second target deceleration Gbt2 becomes equal to or greater than the target deceleration Gbt4 for the automatic travel control. The second target deceleration Gbt2 is gradually decreased when the elapsed time Tb from the start of the warning braking reaches the predetermined value Tbe, and the warning braking is terminated when the second target deceleration Gbt2 becomes smaller than the target deceleration Gbt4 for the automatic travel control. However, if the target deceleration Gbt4 for the automatic travel control becomes equal to or greater than the maximum target deceleration Gbt2max before the elapsed time Tb from the start of the warning braking reaches the predetermined value Tbe, the warning braking is terminated at that time point, and thereafter the automatic travel control is performed in the deceleration control mode.

Meanwhile, in the case where the automatic travel control is being performed in the deceleration control mode when the ECU 30 determines that the warning braking is needed, the ECU 30 starts the warning braking if the target deceleration Gbt4 for the automatic travel control is smaller than an allowable reference value Gbt4s for the warning braking (which is a positive constant smaller than the maximum target deceleration Gbt2max). However, if the target deceleration Gbt4 for the automatic travel control at the above-described time point is equal to or greater than the allowable reference value Gbt4s for the warning braking, the ECU 30 does not start the warning braking.

Once the ECU 30 starts the warning braking, even if the target deceleration Gbt4 for the automatic travel control becomes equal to or greater than the allowable reference value Gbt4s for the warning braking, the ECU 30 continues the warning braking, until a predetermined warning braking termination condition is satisfied, i.e., the elapsed time Tb from the start of the warning braking reaches the predetermined value Tbe, or until the target deceleration Gbt4 for the automatic travel control becomes equal to or greater than the maximum target deceleration Gbt2max.

Meanwhile, the damage reduction braking is started when the predicted collision time Ta becomes equal to or smaller than a damage reduction braking start reference value Ta2 (a positive constant) which is smaller than the warning braking start reference value Ta1. In the damage reduction braking, the vehicle deceleration is increased to the maximum target deceleration Gbt4max which is higher than the maximum target deceleration Gbt2max. However, the damage reduction braking does not constitute the feature of the invention, and thus may be executed in an arbitrary manner known in the present technical field.

As is the case of the deceleration control mode of the automatic travel control, the obstacle-related automatic braking is also performed by reducing the output of the engine 14 through outputting of the engine output decrease request signal to the ECU 48, and by increasing the braking force by means of increase of the brake pressures Pi (i=fr, fl; rr, rl) of the individual wheels by use of the braking apparatus 16.

The ECU 30 computes a first target deceleration Gbt1 of the vehicle, which is based on brake operation by the driver, from the master cylinder pressure Pm in a manner known in the present technical field. The ECU 30 uses the first target deceleration Gbt1 as a final target deceleration Gbt of the vehicle, when the obstacle-related automatic braking and braking by the automatic travel control are not needed.

If braking by the automatic travel control is not needed but the obstacle-related automatic braking is needed, the ECU 30 computes the second target deceleration Gbt2 of the vehicle for the warning braking and a third target deceleration Gbt3 of the vehicle for the damage reduction braking, and uses the second target deceleration Gbt2 or the third target deceleration Gbt3 as the final target deceleration Gbt of the vehicle. Since the warning braking aims to issue a warning to the driver, the value of the target deceleration Gbt2 for the warning braking may be smaller than the target deceleration Gbt3 for the damage reduction braking which aims to cause emergency stop of the vehicle.

Meanwhile, if a signal representing a fourth target deceleration Gbt4 has been input from the ECU 48 in a state where the obstacle-related automatic braking is not needed, braking by the automatic travel control is needed. Accordingly, the ECU 30 uses the fourth target deceleration Gbt4 as the final target deceleration Gbt of the vehicle.

On the contrary, if the warning braking is needed when a signal representing the fourth target deceleration Gbt4 has been input from the ECU 48, the ECU 30, in principle, uses a larger value of the second target deceleration Gbt2 and the fourth target deceleration Gbt4 as the final target deceleration Gbt of the vehicle. However, if the fourth target deceleration Gbt4 when the warning braking becomes necessary is equal to or greater than the reference value Gbt4s, the ECU 30 uses the fourth target deceleration Gbt4 as the final target deceleration Gbt of the vehicle, to thereby continue the automatic travel control without performing the warning braking.

Further, if the damage reduction braking is needed when a signal representing the fourth target deceleration Gbt4 has been input from the ECU 48, braking must be performed with the highest priority being given to avoidance of collision with the obstacle and damage reduction. Accordingly, the ECU 30 uses the third target deceleration Gbt3 as the final target deceleration Gbt of the vehicle.

Notably, the ECU 30 feed-back controls the brake pressures of the individual wheels, such that the brake pressures Pi (i=fr, fl, rr, rl) of the respective wheels coincide with the corresponding target brake pressures Pti. The ECU 30 performs the feed-back control by computing the target brake pressures Ptfr, Ptfl, Ptrr, Ptrl of the individual wheels from the final target deceleration Gbt and by controlling the braking apparatus 16.

Figure 3:
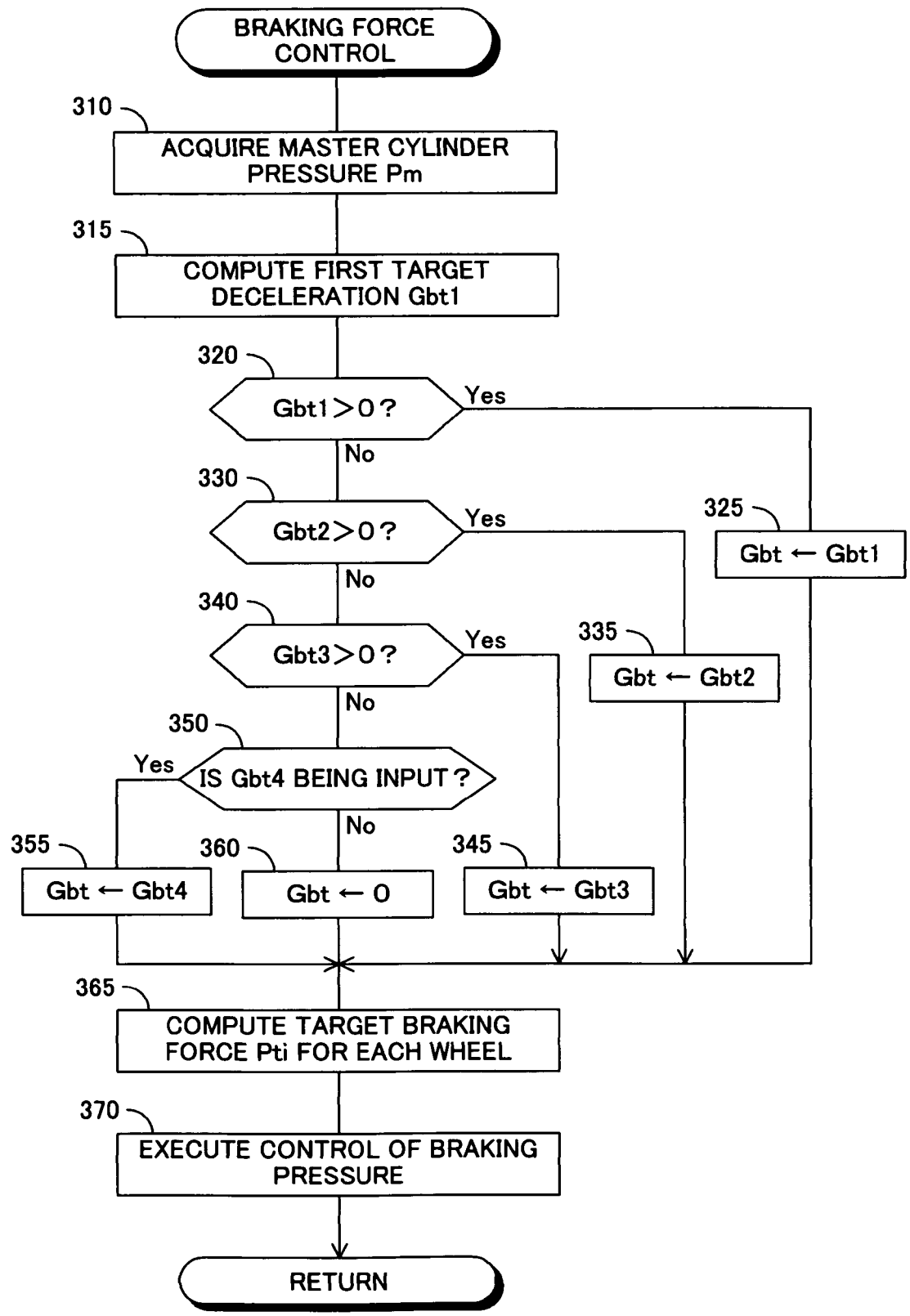
FIG. 3 is a flowchart showing a braking force control routine in the embodiment.

Next, a braking force control routine in the present embodiment will be described with reference to the flowchart shown in FIG. 3. Control according to the flowchart shown in FIG. 3 is started when an unillustrated ignition switch is turned on, and is repeatedly executed at predetermined time intervals.

First, in step 310, a signal representing the master cylinder pressure Pm detected by the pressure sensor 42, etc. are read. In step 315, the first target deceleration Gbt1 of the vehicle is computed from the master cylinder pressure Pm in a manner known in the present technical field, such that the first target deceleration Gbt1 of the vehicle increases as the master cylinder pressure Pm increases.

In step 320, a determination is made as to whether or not the first target deceleration Gbt1 assumes a positive value, that is, whether or not the vehicle is being decelerated by means of brake operation by the driver. If a negative determination is made, the control proceeds to step 330. If a positive determination is made, the final target deceleration Gbt of the vehicle is set to the first target deceleration Gbt1 in step 325, and subsequently the control proceeds to step 365.

In step 330, a determination is made as to whether or not the second target deceleration Gbt2 of the vehicle for the warning braking is computed to be a positive value by the target deceleration computation routine for the warning braking, which will be described later, that is, whether or not the warning braking is needed. If a negative determination is made, the control proceeds to step 340. If a positive determination is made, the final target deceleration Gbt of the vehicle is set to the second target deceleration Gbt2 in step 335, and subsequently the control proceeds to step 365.

In step 340, a determination is made as to whether or not the third target deceleration Gbt3 of the vehicle for the damage reduction braking is computed to be a positive value by an unillustrated target deceleration computation routine for the damage reduction braking, that is, whether or not the damage reduction braking is needed. If a negative determination is made, the control proceeds to step 350. If a positive determination is made, the final target deceleration Gbt of the vehicle is set to the third target deceleration Gbt3 in step 345, and subsequently the control proceeds to step 365.

In step 350, a determination is made as to whether or not a signal representing the fourth target deceleration Gbt4 of the vehicle—which is used to achieve braking by means of the automatic travel control in the deceleration control mode—has been input from the ECU 48, that is, whether or not braking for achieving the automatic travel control is needed. If a negative determination is made, the control proceeds to step 360. If a positive determination is made, the final target deceleration Gbt of the vehicle is set to the fourth target deceleration Gbt4 in step 355, and subsequently the control proceeds to step 365.

In step 360, the final target deceleration Gbt of the vehicle is set to 0. In step 365, the target brake pressures Pti (i=fr, fl, rr, rl) of the individual wheels are computed from the final target deceleration Gbt. In step 370, the braking apparatus 16 is controlled such that the brake pressures Pi of the individual wheels coincide with the corresponding target brake pressures Pti, whereby the brake pressures of the individual wheels are feed-back controlled.

Figure 4:
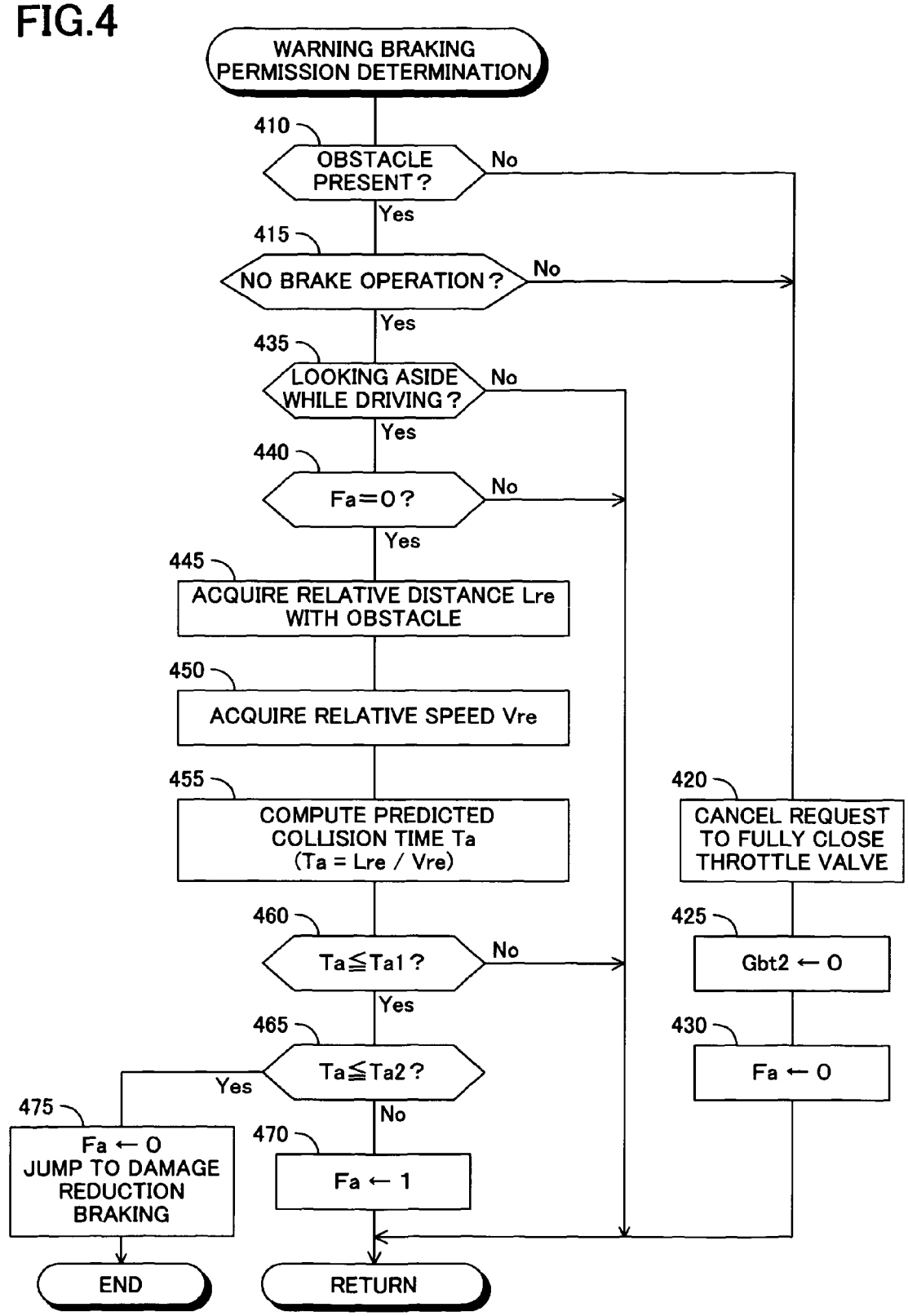
FIG. 4 is a flowchart showing a warning braking permission determination routine in the embodiment.

Next, a permission determination routine for the warning braking in the present embodiment will be described with reference to the flowchart shown in FIG. 4. Determination control according to the flowchart shown in FIG. 4 is also started when the unillustrated ignition switch is turned on, and is repeatedly executed at predetermined time intervals.

First, in step 410, a determination is made as to whether or not an obstacle is present ahead of the vehicle 11 in the traveling direction thereof from signals from the radar sensor 32 and the vehicle front photographing camera 34. If a negative determination is made, the control proceeds to step 420, and if a positive determination is made, the control proceeds to step 415.

In step 415, it is determined on, for example, from the master cylinder pressure Pm, whether or not the driver has yet to carry out brake operation, that is, whether or not the driver has yet to decelerate the vehicle by means of braking. If a positive determination is made, the control proceeds to in step 420. If a negative determination is made, it is inferred that the driver has recognized an obstacle ahead of the vehicle and the warning braking is not needed. Accordingly, the control proceeds to step 420.

In step 420, when a request has been made to the ECU 48 to fully close the throttle valve, the request is cancelled. In step 425, the target deceleration Gbt2 for the warning braking is set to 0. In step 430, a flag Fa is reset to 0.

In step 435, a determination is made, from a signal from the driver photographing camera 36, as to whether or not the driver is looking aside, that is, whether or not the driver is highly likely not to have recognized the obstacle ahead of the vehicle. If a negative determination is made, control returns to step 410, and if a positive determination is made, the control proceeds to step 440.

In step 440, a determination is made as to whether or not the flag Fa is 0, that is, whether or not the warning braking has yet to be permitted. If a negative determination is made, control returns to step 410, and if a positive determination is made, the control proceeds to step 445.

In step 445, information on the relative distance Lre between the vehicle and the obstacle is acquired from the radar sensor 32 and the vehicle front photographing camera 34. In step 450, information on the relative speed Vre between the vehicle and the obstacle is acquired from the radar sensor 32 and the vehicle front photographing camera 34. In step 455, the predicted collision time Ta with the obstacle is computed by dividing the relative distance Lre by the relative speed Vre.

In step 460, a determination is made as to whether or not the predicted collision time Ta is equal to or less than the start reference value Ta1 for the warning braking, that is, whether or not the warning braking should be permitted. If a negative determination is made, control returns to step 410, and if a positive determination is made, the control proceeds to step 465.

In step 465, a determination is made as to whether or not the predicted collision time Ta is equal to or less than the start reference value Ta2 for the damage reduction braking, that is, whether or not the damage reduction braking should be executed. If a negative determination is made, the flag Fa is set to 1, and subsequently control returns to step 410. If a positive determination is made, the flag Fa is reset to 0 in step 475, and the control jumps to control for the damage reduction braking.

Figure 5:
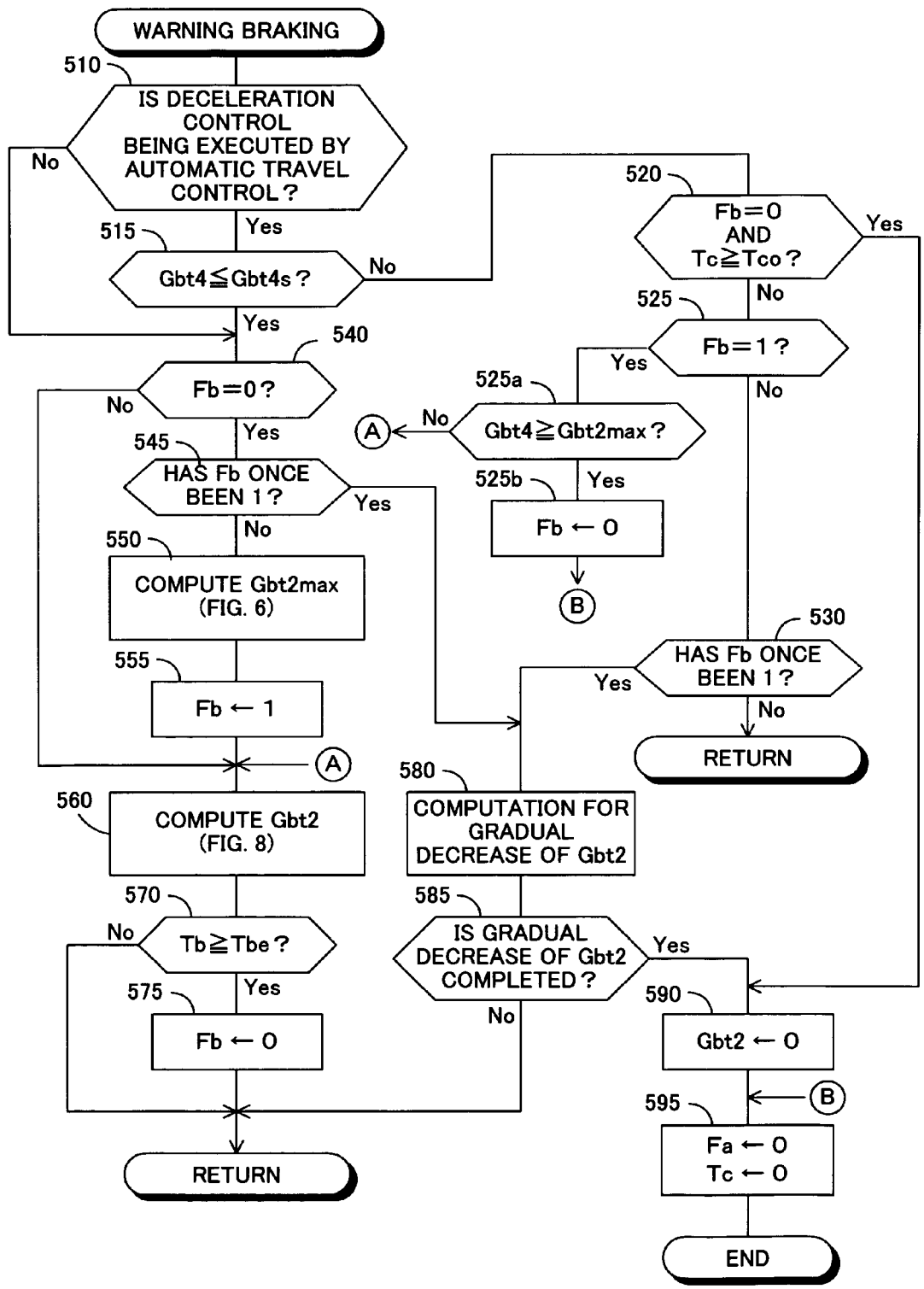
FIG. 5 is a flowchart showing a warning braking control routine in the embodiment.

Next, a routine for computing the target deceleration Gbt2 for the warning braking in the present embodiment will be described with reference to the flowchart shown in FIG. 5. Control according to the flowchart shown in FIG. 5 is started when the flag Fa is changed from 0 to 1, and is repeatedly executed at predetermined time intervals.

First, in step 510, a determination is made as to whether or not deceleration control is being carried out by the automatic travel control in the deceleration control mode. If a negative determination is made, the control proceeds to step 540, and if a positive determination is made, the control proceeds to step 515.

In step 515, a determination is made as to whether or not the target deceleration Gbt4 for the automatic travel control is equal to or smaller than the allowable reference value Gbt4s for the warning braking. If a positive determination is made, the control proceeds to step 540, and if a negative determination is made, the control proceeds to step 520.

In step 520, a determination is made as to whether or not a flag Fb is 0 and an elapsed time Tc since a time point when the flag Fa has changed from 0 to 1 is equal to or greater than a reference time Tco (a positive constant), that is, Whether or not the state where the warning braking is not executed despite the need thereof has continued for a time period equal to or greater than the reference time Tco. If a positive determination is made, the control proceeds to step 590, and if a negative determination is made, the control proceeds to step 525.

In step 525, a determination is made as to whether or not the flag Fb is 1, that is, whether or not the warning braking is being executed. If a negative determination is made, the control proceeds to step 560, and if a positive determination is made, the control proceeds to step 525a.

In step 525a, a determination is made as to whether or not the target deceleration Gbt4 for the automatic travel control is equal to or greater than the maximum target deceleration Gbt2max for the warning braking, that is, whether or not the warning braking should be interrupted. If a negative determination is made, the control proceeds to step 560, and if a positive determination is made, the flag Fb is reset to 0 in step 525b, and subsequently the control proceeds to step 595.

In step 530, a determination is made as to whether or not the flag Fb has once become 1 after the control according to the flowchart shown in FIG. 5 was started, that is, whether or not the warning braking has once been executed. If a positive determination is made, the control proceeds to step 580, and if a negative determination is made, control returns to step 510.

In step 520, a determination is made as to whether or not the flag Fb is 0. If a negative determination is made, the control proceeds to step 560, and if a positive determination is made, the control proceeds to step 545.

In step 545, a determination is made as to whether or not the flag Fb has once become 1 after the control according to the flowchart shown in FIG. 5 was started. If a positive determination is made, the control proceeds to step 580, and if a negative determination is made, the control proceeds to step 550.

In step 550, the maximum target deceleration Gbt2max for the warning braking is computed according to the routine shown in FIG. 6 as will be described later. In step 555, the flag Fb is set to 1. In step 560, the target deceleration Gbt2 for the warning braking is computed in accordance with the routine shown in FIG. 8, as will be described later.

In step 570, a determination is made as to whether or not the elapsed time Tb from the warning brake start time is equal to or greater than a termination reference value Tbe (a positive constant) for the warning braking. If a negative determination is made, control returns to step 510, and if a positive determination is made, the flag Fb is reset to 0 in step 575.

In step 580, the target deceleration Gbt2 is gradually decreased by setting the target deceleration Gbt2 for the warning braking to a value of "the previous value of the target deceleration Gbt2−ΔGbt2$d$". In step 585, a determination is made as to whether or not the processing of gradually decreasing the target deceleration Gbt2 for the warning braking is completed. In this case, a determination as to whether or not the gradual decrease processing is completed is made as follows: If deceleration control by means of the automatic travel control is executed, this determination is made based on whether or not the value of "the previous value of the target deceleration Gbt2 for the warning braking—ΔGbt2$d$" (a positive constant) is equal to or smaller than the target deceleration Gbt4 for the automatic travel control. On the other hand, if deceleration control by means of the automatic travel control is not executed, the determination is made based on whether or not the value of "the previous value of the target deceleration Gbt2 for the warning braking—ΔGbt2$d$" is equal to or smaller than 0.

If the target deceleration Gbt4 for the automatic travel control when step 585 is executed is equal to or greater than the maximum target deceleration Gbt2max for the warning braking, the processing of gradually decreasing the target deceleration Gbt2 for the warning braking is not needed. Accordingly, in that case, a positive determination is made in step 585.

In step 590, the target deceleration Gbt2 for the warning braking is set to 0. In step 595, the flag Fa is reset to 0, and the count value for the elapsed time Tb is reset to 0. Subsequently, the control according to the routine shown in FIG. 5 ends.

Although not illustrated in FIG. 5, while the flag Fb is 1 or while the warning braking is being executed, the warning light 46 is blinked. As a result of this, a warning indicating that the vehicle may collide with the obstacle is visually provided to the driver. In the meantime, the warning light 46 is lit while the damage reduction braking is being executed. As a result of this, a warning that the vehicle is more likely to collide with the obstacle is visually provided, and a visual display indicating that the damage reduction braking is being executed is also provided.

In some cases, the warning braking is to be carried out, but is not carried out, because the target deceleration Gbt4 for the automatic travel control is greater than the allowable reference value Gbt4$s$ for the warning braking, that is, if a negative determination is made in step 515. In such a case, the warning light 46 is blinked, whereby a warning that the vehicle may collide with the obstacle is visually provided to the driver.

Figure 6:
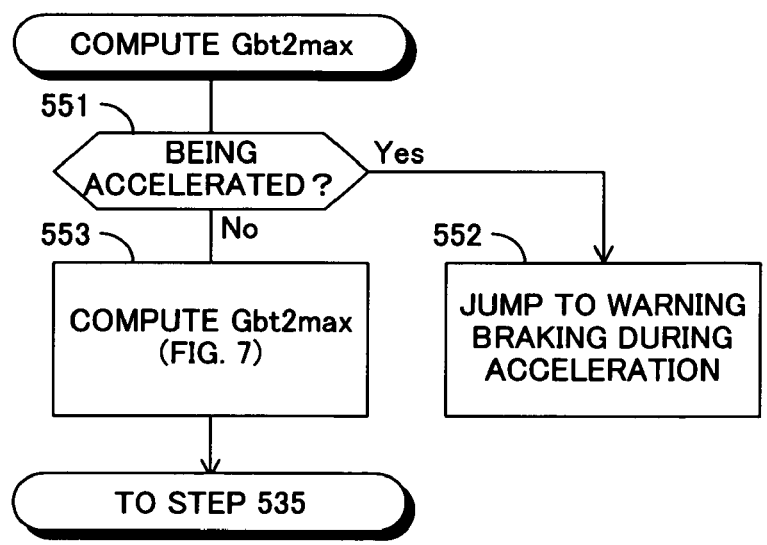
FIG. 6 is a flowchart showing a computation routine for computing a maximum target deceleration Gbt2max for the warning braking in step 525 in FIG. 5.

As illustrated in FIG. 6, a determination is made as to whether or not the vehicle is being accelerated in step 551. If a negative determination is made, the control proceeds to step 553, and if a positive determination is made, the control jumps, in step 552, to an unillustrated control routine for the warning braking during acceleration.

Figure 7:
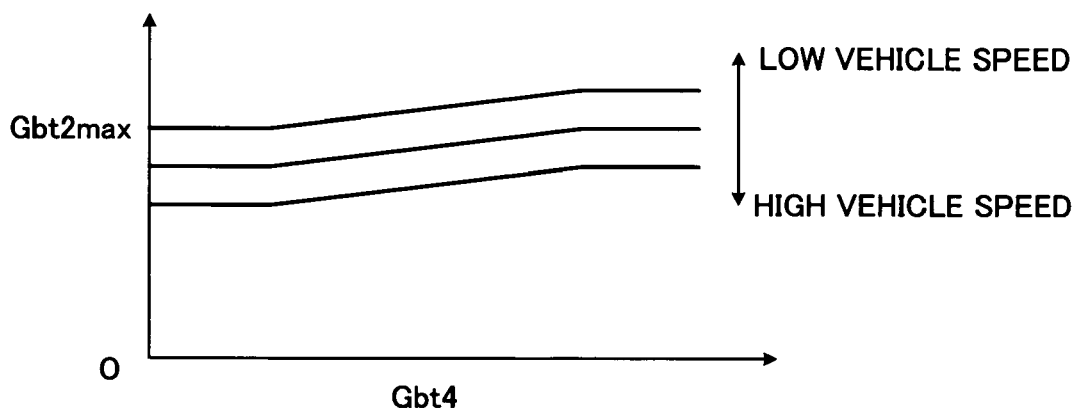
FIG. 7 is a graph showing the relation among target deceleration Gbt4 for automatic travel control, vehicle speed V, and the maximum target deceleration Gbt2max for the warning braking.

In step 553, by reference to a map shown in FIG. 7, the maximum target deceleration Gbt2max for the warning braking is computed from the target deceleration Gbt4 and the vehicle speed V, such that it increases as the target deceleration Gbt4 for the automatic travel control increases, and it decreases as the vehicle speed V increases.

Meanwhile, the warning braking during acceleration is performed such that the deceleration of the vehicle is controlled according to a acceleration change pattern, which is similar to the deceleration change pattern illustrated in FIG. 2, with a value obtained by subtracting a positive predetermined value from the vehicle acceleration Gx at that time point being used as the minimum acceleration for the warning braking. Further, in the case of the warning braking during acceleration as well, the decrease amount of the vehicle acceleration is variably set in accordance with the vehicle acceleration Gx and the vehicle speed V, such that it decreases as the vehicle acceleration Gx and the vehicle speed V increase, respectively.

Figure 8:
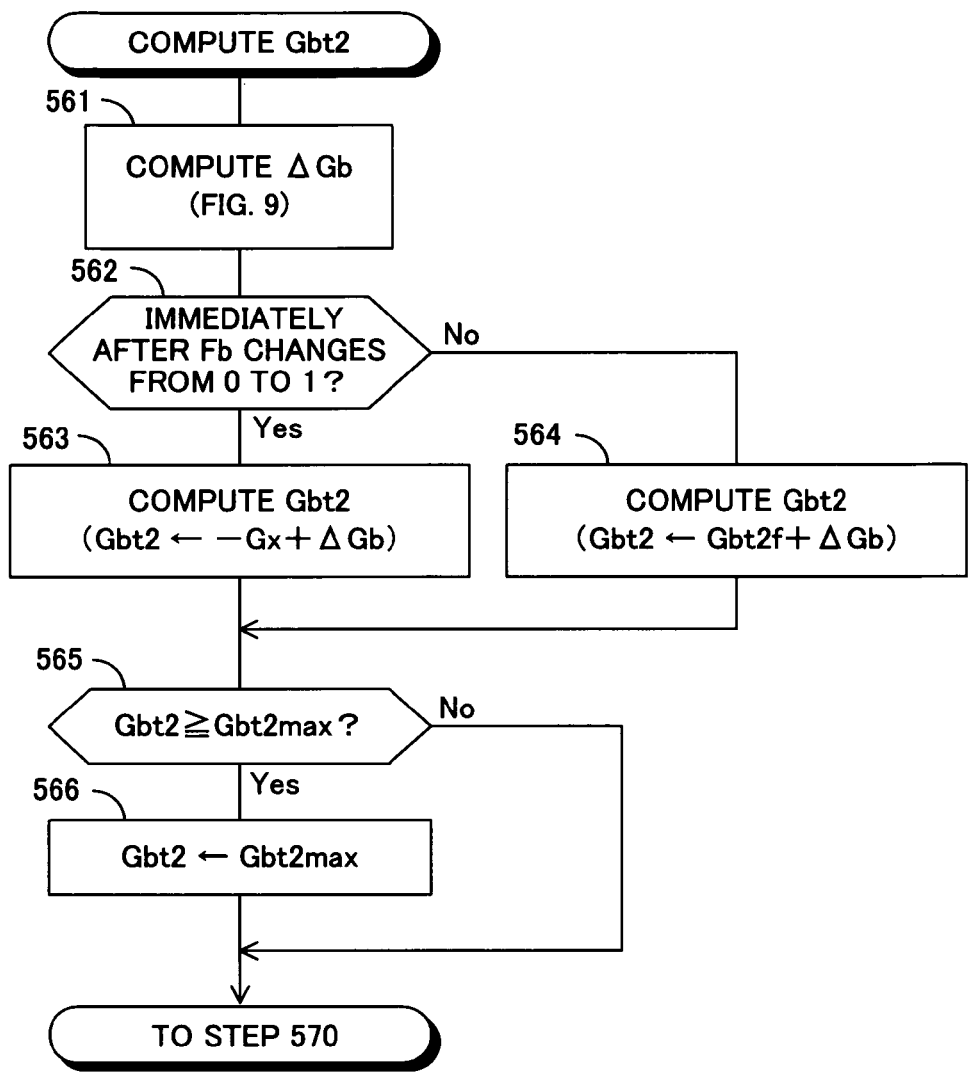
FIG. 8 is a flowchart showing a computation routine for computing a target deceleration Gbt2 for the warning braking in step 540 in FIG. 5.
Figure 9:
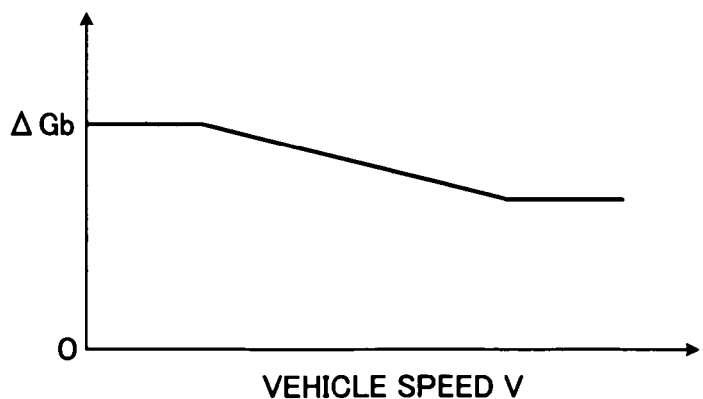
FIG. 9 is a graph showing the relation between the vehicle speed V and a per-cycle increase amount ΔGb of the target deceleration Gbt2 for the warning braking.

As illustrated in FIG. 8, in step 561, by reference to a map illustrated in FIG. 9, the increase amount ΔGb of the target deceleration Gbt2 for the warning braking is computed based on the vehicle speed V, such that it decreases as the vehicle speed V increases.

In step 562, a determination is made as to whether or not the flag Fb has just been changed from 0 to 1. If a positive determination is made, the target deceleration Gbt2 for the warning braking is set to "−Gx+ΔGb" in step 563. If a negative determination is made, in step 564, the target deceleration Gbt2 for the warning braking is set to "Gbt2$f$+ΔGb," where Gbt2$f$ represents the previous value of the target deceleration Gbt2 for the warning braking.

In step 565, a determination is made as to whether or not the value of the target deceleration Gbt2 for the warning braking is equal to or greater than the maximum target deceleration Gbt2max, that is, whether or not the gradual increase of the target deceleration Gbt2 for the warning braking is completed. If a negative determination is made, the control proceeds to step 570. If a positive determination is made, the target deceleration Gbt2 for the warning braking is set to the maximum target deceleration Gbt2max in step 566.

As described above, if the predicted collision time Ta becomes equal to or smaller than the start reference value Ta1 for the warning braking in a state where an obstacle is present ahead of the vehicle 11 in the traveling direction thereof (step 410), the driver does not carry out brake operation (step 415), and the driver is looking aside (step 420), it is determined that the warning braking is needed, and, in subsequent step 470, the flag Fa is rewritten from 0 to 1.

When the flag Fa is changed from 0 to 1, the control for the warning braking according to the flowchart shown in FIG. 5 is started. If deceleration control by means of the automatic travel control is not performed, a negative determination is made in step 510, and the warning braking is performed by execution of step 540 and subsequent steps. In this case, first, the maximum target deceleration Gbt2max for the warning braking is computed in step 550, the target deceleration Gbt2 for the warning braking is gradually increased until it reaches the maximum target deceleration Gbt2max in step 560, the target deceleration Gbt2 for the warning braking is maintained at the maximum target deceleration Gbt2max until a period of time which is equal to or larger than the termination reference value Tbe has passed since the warning brake start time, and subsequently, in step 585, the target deceleration Gbt2 for the warning braking is gradually decreased.

On the contrary, if deceleration control by means of the automatic travel control is being performed, a positive determination is made in step 510. If the target deceleration Gbt4 for the automatic travel control is equal to or smaller than the allowable reference value Gbt4$s$ for the warning braking, a positive determination is made in step 515, whereby the warning braking is started.

However, if deceleration control by means of the automatic travel control is being performed and the target deceleration Gbt4 for the automatic travel control is greater than the allowable reference value Gbt4s for the warning braking, a negative determination is made in step 515, and thus the warning braking is not started. Meanwhile, when the warning braking is started, the flag Fb is set to 1 in step 555. Accordingly, even if the target deceleration Gbt4 for the automatic travel control becomes greater than the allowable reference value Gbt4s for the warning braking after the warning braking is once started, a positive determination is made in step 525, and the flag Fb is maintained at 1 until a positive determination is made in step 570, whereby the warning braking is continued.

Next, operation of the above-described embodiment will be described, with reference to time charts shown in FIGS. 10 to 16, for various cases where the target deceleration for the automatic travel control changes in a state in which the driver does not carry out acceleration/deceleration.

Figure 10:
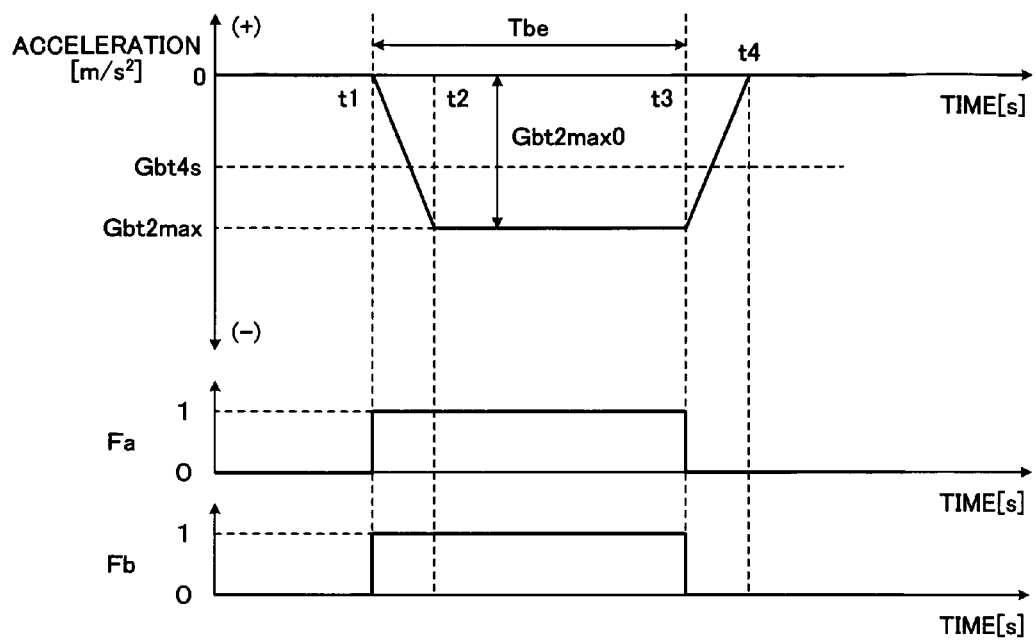
FIG. 10 is a time chart showing an operational example of the warning braking in the embodiment for the case where neither acceleration/deceleration operation by a driver nor acceleration/deceleration control by means of the automatic travel control is performed and thus acceleration/deceleration of a vehicle is not changed.

FIG. 10 is a time chart showing an operational example of the warning braking in the embodiment for the case where neither acceleration/deceleration operation by the driver nor acceleration/deceleration control by means of the automatic travel control is performed and thus acceleration/deceleration of the vehicle does not change.

As illustrated in FIG. 10, assume that the permission condition for the warning braking is satisfied at a time point t1. In this case, in FIG. 4, a positive determination is made in each of steps 410 to 440 and 460 and a negative determination is made in step 465, whereby the flag Fa is set to 1 in step 470. Next, in FIG. 5, a negative determination is made in step 510, a positive determination is made in step 540, and a negative determination is made in step 545, and the maximum target deceleration Gbt2max is computed in step 550. Further, the flag Fb is set to 1 in step 555, and gradual increase of the target deceleration Gbt2 for the warning braking is started in step 560.

Assume that the target deceleration Gbt2 reaches the maximum target deceleration Gbt2max at a time point t2, and a time point where a predetermined time Tbe has passed since the time point t1 is a time point t3. In this case, a positive determination is made from the time point t2 to the time point t3 in step 565 in FIG. 8. As a result of this, the target deceleration Gbt2 is maintained at the maximum target deceleration Gbt2max in step 566.

At the time point t3, the flag Fb is reset to 0 because a positive determination is made in step 570 of FIG. 5. A positive determination is made in each of steps 540 and 545 of the next cycle, gradual decrease of the target deceleration Gbt2 is started in step 580, and a negative determination is made in step 585. Next, when gradual decrease of the target deceleration Gbt2 is completed at the time point t4, a positive determination is made in step 585, the target deceleration Gbt2 is set to 0 in step 590, and the flag Fa is reset to 0 in step 595, upon which the warning braking is terminated.

Figure 11:
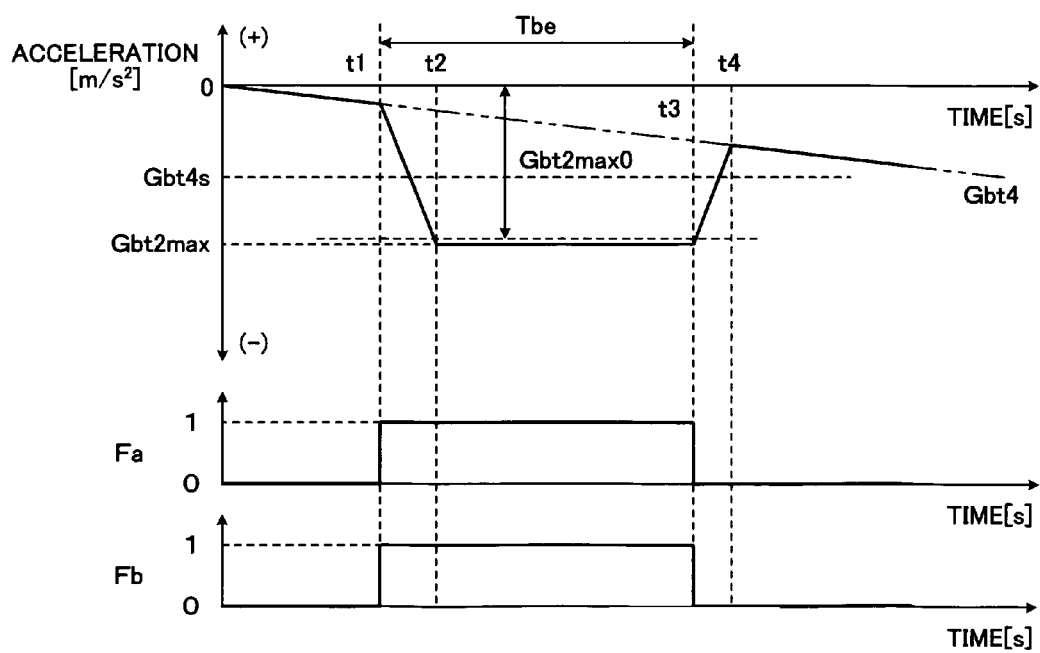
FIG. 11 is a time chart showing an operational example of the warning braking in the embodiment for the case where, despite acceleration/deceleration not being carried out by the driver, the vehicle deceleration slowly increases, due to deceleration by means of the automatic travel control, within a range lower than an allowable reference value for the warning braking.

FIG. 11 is a time chart showing an operational example of the warning braking in the embodiment for the case where, despite acceleration/deceleration not being carried out by the driver, the vehicle deceleration slowly increases, due to deceleration by means of the automatic travel control, within a range less than the allowable reference value for the warning braking.

As illustrated in FIG. 11, assume that the permission condition for the warning braking is satisfied, that the flag Fa is set to 1 at a time point t1 in the course of slow and gradual increase of the target deceleration Gbt4 for the automatic travel control from 0, and that the target deceleration Gbt4 at the time point t1 is smaller than the allowable reference value Gbt4s for the warning braking. In this case, at and before the time point t1, the target deceleration Gbt of the vehicle is set to the target deceleration Gbt4 for the automatic travel control. At the time point t1, the maximum target deceleration Gbt2max is computed to assume a value slightly greater than the value in the case of FIG. 10, the flag Fb is set to 1, and gradual increase of the target deceleration Gbt2 for the warning braking is started.

When the target deceleration Gbt2 reaches the maximum target deceleration Gbt2max at a time point t2, the target deceleration Gbt2 is maintained at the maximum target deceleration Gbt2max from the time point t2 to a time point t3. Next, at the time point t3, gradual decrease of the target deceleration Gbt2 is started. When, at a time point t4, the target deceleration Gbt2 becomes equal to or smaller than the target deceleration Gbt4 for the automatic travel control and thus gradual decrease of the target deceleration Gbt2 is completed, a positive determination is made in step 585, upon which the warning braking is terminated. At the time point t4 and thereafter, the target deceleration Gbt of the vehicle is set to the target deceleration Gbt4 for the automatic travel control.

Figure 12:
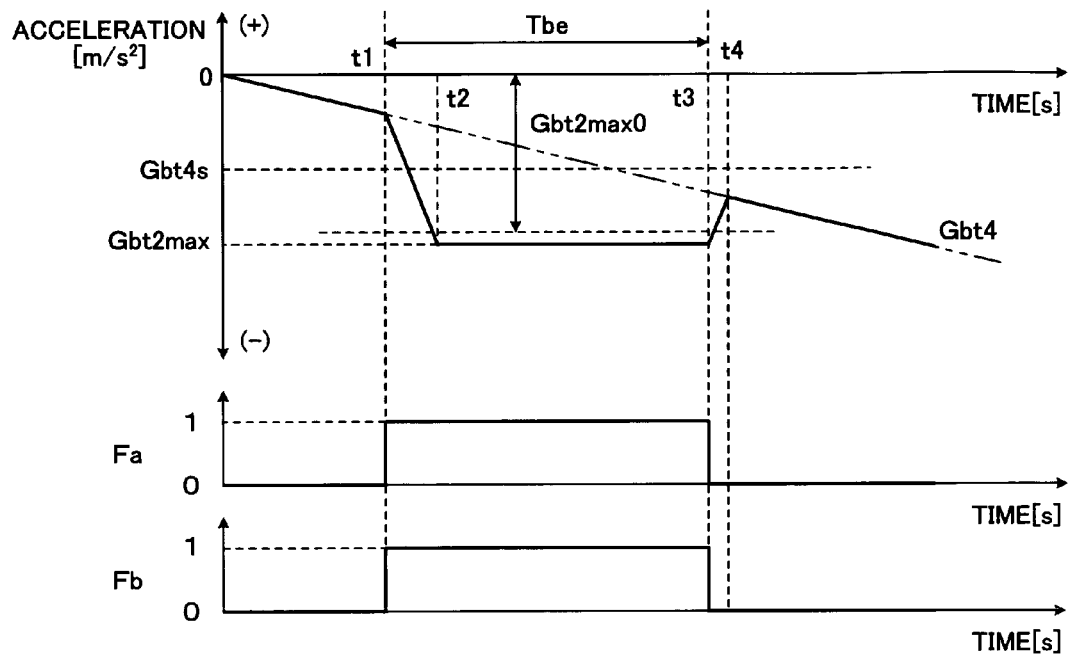
FIG. 12 is a time chart showing an operational example of the warning braking in the embodiment for the case where, despite acceleration/deceleration not being carried out by the driver, the vehicle deceleration increases, due to deceleration by means of the automatic travel control, to a value higher than the allowable reference value for the warning braking.

FIG. 12 is a time chart showing an operational example of the warning braking in the embodiment for the case where, despite acceleration/deceleration not being carried out by the driver, the vehicle deceleration increases, due to deceleration by means of the automatic travel control, to a value higher than the allowable reference value for the warning braking.

As illustrated in FIG. 12, assume that the target deceleration Gbt4 for the automatic travel control gradually increases from 0 to a value higher than the allowable reference value Gbt4s for the warning braking, that the permission condition for the warning braking is satisfied at a time point t1 in the course of the above-described gradual increase, and that the target deceleration Gbt4 at a time point t1 is smaller than the allowable reference value Gbt4s for the warning braking. In such cases, as is the case with FIG. 11, the target deceleration Gbt of the vehicle is set to the target deceleration Gbt4 for the automatic travel control at and before the time point t1. At the time point t1, the maximum target deceleration Gbt2max is computed to assume a value slightly greater than the case of FIG. 11, the flag Fb is set to 1, and gradual increase of the target deceleration Gbt2 for the warning braking is started.

When the target deceleration Gbt2 reaches the maximum target deceleration Gbt2max at a time point t2, as is the case with FIG. 11, the target deceleration Gbt2 is maintained at the maximum target deceleration Gbt2max from the time point t2 to a time point t3. Next, gradual decrease of the target deceleration Gbt2 is started from the time point t3. When the target deceleration Gbt2 becomes equal to or smaller than the target deceleration Gbt4 for the automatic travel control at a time point t4 and thus gradual decrease of the target deceleration Gbt2 is completed, the warning braking is terminated. At the time point t4 and thereafter, the target deceleration Gbt of the vehicle is set to the target deceleration Gbt4 for the automatic travel control.

Figure 13:
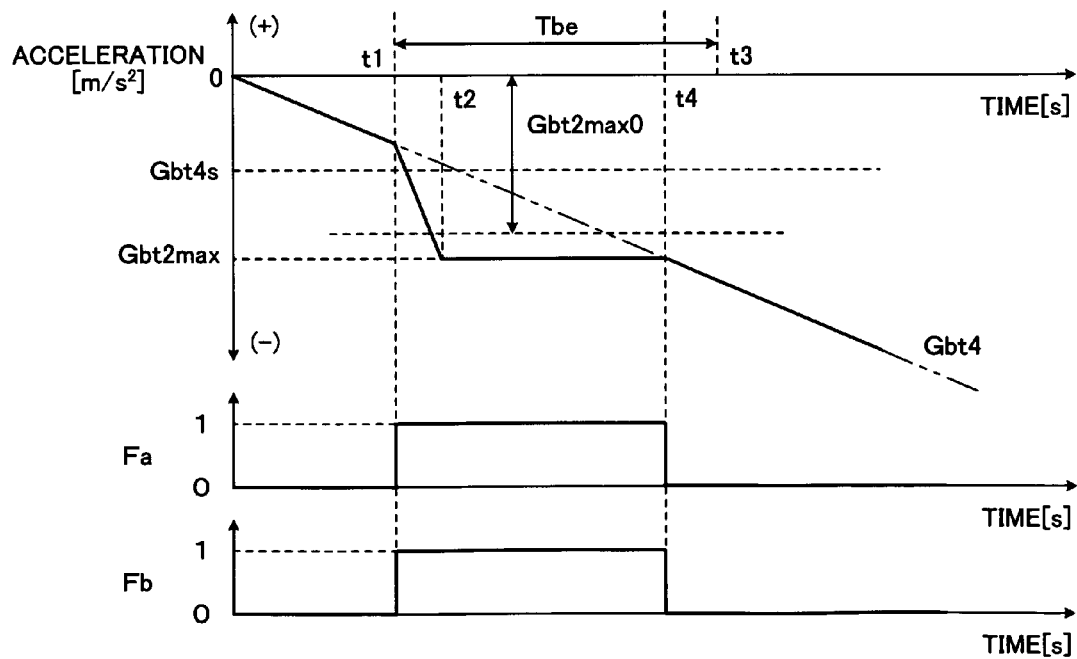
FIG. 13 is a time chart showing an operational example of the warning braking in the embodiment for the case where, despite acceleration/deceleration not being carried out by the driver, the vehicle deceleration relatively sharply increases, due to deceleration by means of the automatic travel control, to a value higher than the maximum target deceleration for the warning braking.

FIG. 13 is a time chart showing an operational example of the warning braking in the embodiment for the case where, despite acceleration/deceleration not being carried out by the driver, the vehicle deceleration relatively sharply increases, due to deceleration by means of the automatic travel control, to a value higher than the maximum target deceleration for the warning braking.

As illustrated in FIG. 13, assume that the target deceleration Gbt4 for the automatic travel control gradually increases from 0 to a value higher than the allowable reference value Gbt4s for the warning braking, that the permission condition for the warning braking is satisfied at a time point t1 in the course of the above-described gradual increase, and that the target deceleration Gbt4 at the time point t1 is smaller than the allowable reference value Gbt4s for the warning braking. As is the case with FIG. 11, at and before the time point t1, the target deceleration Gbt of the vehicle is set to the target deceleration Gbt4 for the automatic travel control. At the time point t1, the maximum target deceleration Gbt2max is computed to assume a value greater than the value in the case of FIG. 11, the flag Fb is set to 1, and gradual increase of the target deceleration Gbt2 for the warning braking is started.

Assume that the target deceleration Gbt2 reaches the maximum target deceleration Gbt2max at a time point t2, and that the target deceleration Gbt4 for the automatic travel control becomes equal to or greater than the maximum target deceleration Gbt2max at a time point t4, which is earlier than a time point t3 that is later than the time point t1 by the predetermined time Tbe. In this case, the target deceleration Gbt2 is maintained at the maximum target deceleration Gbt2max from the time point t2 to the time point t4. However, at the time point t4, a positive determination is made in step 525a in FIG. 5, the flag Fb is reset to 0 in step 525b, and the flag Fa is reset to 0 in step 595. Accordingly, at the time point t4 the warning braking is terminated, and at the time point t4 and thereafter the target deceleration Gbt of the vehicle is set to the target deceleration Gbt4 for the automatic travel control.

Figure 14:
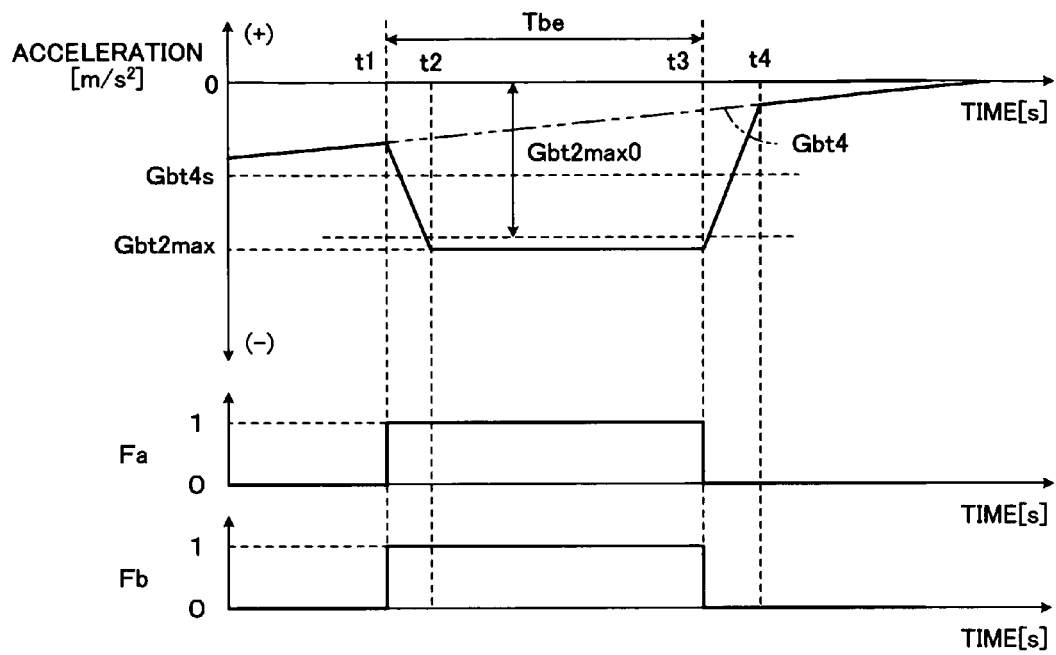
FIG. 14 is a time chart showing an operational example of the warning braking in the embodiment for the case where, despite acceleration/deceleration not being carried out by the driver, the vehicle deceleration slowly decreases, due to deceleration by means of the automatic travel control, within a range lower than the allowable reference value for the warning braking.

FIG. 14 is a time chart showing an operational example of the warning braking in the embodiment for the case where, despite acceleration/deceleration not being carried out by the driver, the vehicle deceleration slowly decreases, due to deceleration by means of the automatic travel control, within a range less than the allowable reference value for the warning braking.

As illustrated in FIG. 14, assume that the target deceleration Gbt4 for the automatic travel control gradually decreases in a range less than the allowable reference value Gbt4s for the warning braking, and the permission condition for the warning braking is satisfied at a time point t1 in the course of the above-described gradual decrease. In this case, as is the cases with FIGS. 11 to 13, at and before the time point t1, the target deceleration Gbt of the vehicle is set to the target deceleration Gbt4 for the automatic travel control. At the time point t1, the maximum target deceleration Gbt2max is computed to assume a value slightly greater than the value in the case of FIG. 11, the flag Fb is set to 1, and gradual increase of the target deceleration Gbt2 for the warning braking is started.

When the target deceleration Gbt2 reaches the maximum target deceleration Gbt2max at a time point t2, as is the case with FIGS. 11 and 12, the target deceleration Gbt2 is maintained at the maximum target deceleration Gbt2max from the time point t2 to a time point t3, and gradual decrease of the target deceleration Gbt2 is started from the time point t3. At a time point t4, the target deceleration Gbt2 becomes equal to or smaller than the target deceleration Gbt4 for the automatic travel control, whereby gradual decrease of the target deceleration Gbt2 is completed, upon which the warning braking is terminated. As is the cases with FIGS. 11 to 13, at the time point t4 and thereafter, the target deceleration Gbt of the vehicle is set to the target deceleration Gbt4 for the automatic travel control.

Figure 15:
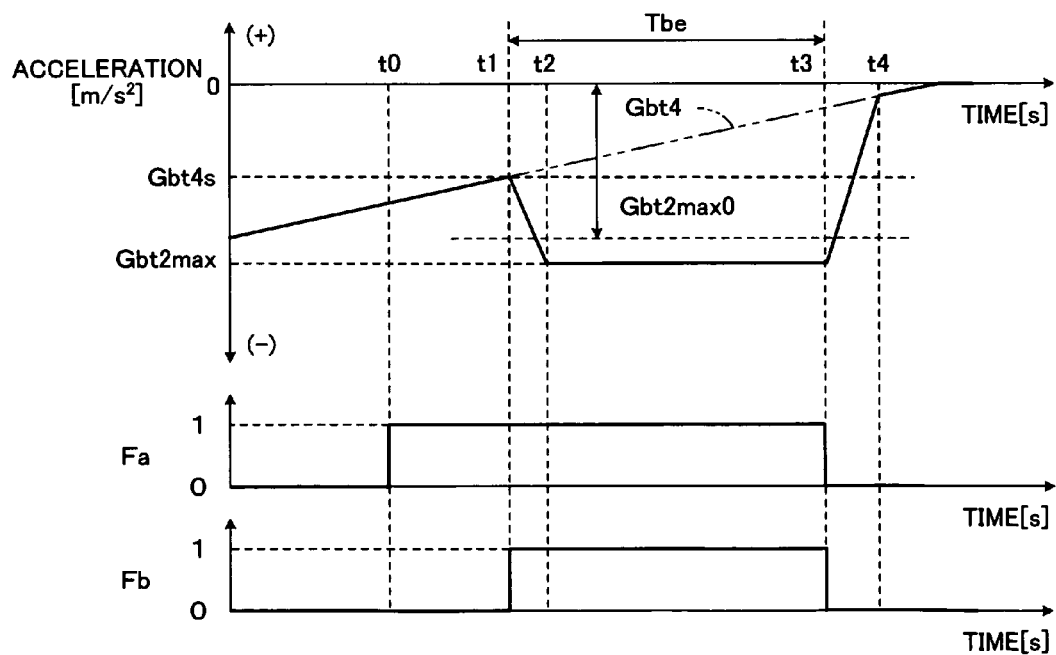
FIG. 15 is a time chart showing an operational example of the warning braking in the embodiment for the case where, despite acceleration/deceleration not being carried out by the driver, the vehicle deceleration relatively sharply decreases, due to deceleration by means of the automatic travel control, from a value higher than the allowable reference value for the warning braking to 0.

FIG. 15 is a time chart showing an operational example of the warning braking in the embodiment for the case where, despite acceleration/deceleration not being carried out by the driver, the vehicle deceleration relatively sharply decreases, due to deceleration by means of the automatic travel control, from a value higher than the allowable reference value for the warning braking to 0.

As illustrated in FIG. 15, assume that the permission condition for the warning braking is satisfied at a time point t0 where the target deceleration Gbt4 for the automatic travel control is greater than the allowable reference value Gbt4s for the warning braking, whereby the flag Fb is set to 1, and that the target deceleration Gbt4 for the automatic travel control becomes equal to or smaller than the allowable reference value Gbt4s for the warning braking at a subsequent time point t1. In this case, from the time point t0 to the time point t1, a negative determination is made in each of steps 515, 520, 525, and 530 in FIG. 5. Thus, at the time point t1, the flag Fb is set to 1, and gradual increase of the target deceleration Gbt2 for the warning braking is started.

Figure 16:
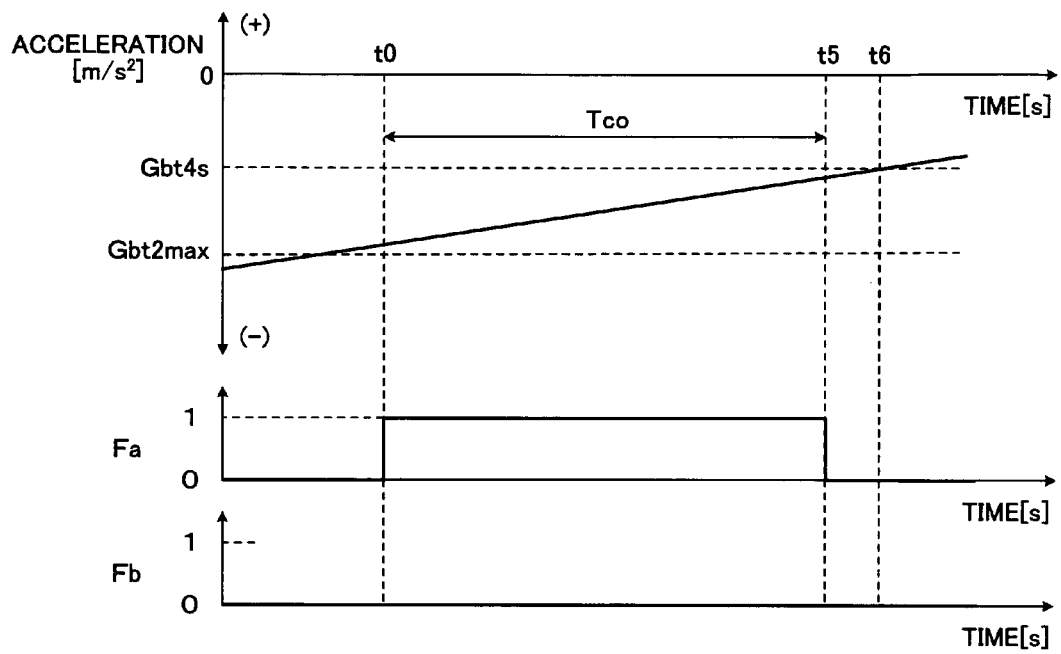
FIG. 16 is a time chart showing an operational example of the warning braking in the embodiment for the case where, despite acceleration/deceleration not being carried out by the driver, the vehicle deceleration slowly decreases, due to deceleration by means of the automatic travel control, from a value higher than the maximum target deceleration for the warning braking.

When the target deceleration Gbt2 reaches the maximum target deceleration Gbt2max at a time point t2, as is the cases with FIGS. 11, 12, and 14, the target deceleration Gbt2 is maintained at the maximum target deceleration Gbt2max from the time point t2 to a time point t3, and gradual decrease of the target deceleration Gbt2 is started from the time point t3. At a time point t4, the target deceleration Gbt2 becomes equal to or smaller than the target deceleration Gbt4 for the automatic travel control, whereby gradual decrease of the target deceleration Gbt2 is completed, upon which the warning braking is terminated. As is the cases with FIGS. 11 to 14, the target deceleration Gbt of the vehicle is set to the target deceleration Gbt4 for the automatic travel control at the time point t4 and thereafter. FIG. 16 is a time chart showing an operational example of the warning braking in the embodiment for the case where, despite acceleration/deceleration not being carried out by the driver, the vehicle deceleration slowly decreases, due to deceleration by means of the automatic travel control, from a value higher than the maximum target deceleration for the warning braking.

As illustrated in FIG. 16, assume that the permission condition for the warning braking is satisfied at a time point t0 where the target deceleration Gbt4 for the automatic travel control is greater than the allowable reference value Gbt4s for the warning braking, whereby the flag Fa is set to 1, that the target deceleration Gbt4 for the automatic travel control is still greater than the allowable reference value Gbt4s for the warning braking even when a predetermined time Tco has passed from the time point t0 and a time point t5 is reached, and that the target deceleration Gbt4 for the automatic travel control becomes equal to or smaller than the allowable reference value Gbt4s for the warning braking at a subsequent time point t6. In this case, from the time point t0 to the time point t5, a negative determination is made in each of steps 515, 520, 525, 530 of FIG. 5, so that the warning braking is not started, and the target deceleration Gbt of the vehicle is set to the target deceleration Gbt4 for the automatic travel control.

Further, at the time point t5, a negative determination is made in step 520, and the flag Fa is reset to 0 in step 595, whereby the control according to the flowchart shown in FIG. 5 is no longer performed. Accordingly, the warning braking is not executed unless the flag Fa is set to 1 again by the control according to the flowchart shown in FIG. 4, so that the target deceleration Gbt of the vehicle is set to the target deceleration Gbt4 for the automatic travel control at the time point t5 and thereafter.

According to the above-described embodiment, even when the warning braking is needed, the warning braking is not performed if the vehicle is being decelerated by the automatic travel control and the target deceleration Gbt4 for the automatic travel control is greater than the allowable reference value Gbt4s for the warning braking; in other words, if the maximum target deceleration Gbt2max for the warning braking is equal to or smaller than the sum of the target deceleration Gbt4 for the automatic travel control and the predetermined value Δbt (=Gbt2max−Gbt4s). Accordingly, in a situation where the warning braking is needed, the following advantageous operations can be realized. If the vehicle is being decelerated by the automatic travel control but the maximum target deceleration Gbt2max for the warning braking is greater than the sum of the target deceleration Gbt4 for the automatic travel control and the predetermined value ΔGbt, a warning can be issued to a crew of the vehicle by reliably performing the warning braking. On the other hand, if the vehicle is being decelerated by the automatic travel control, the maximum target deceleration Gbt2max for the warning braking is equal to or smaller than the sum of the target deceleration Gbt4 for the automatic travel control and the predetermined value ΔGbt, and it is difficult for the crew of the vehicle to effectively recognize the warning braking, through prohibiting the warning braking, the crew of the vehicle is reliably prevented from feeling an unnatural sensation due to the warning braking.

According to the above-described embodiment, as illustrated in FIGS. 12 and 13, the warning braking is continued until the predetermined termination condition is satisfied even when the target deceleration Gbt4 for the automatic travel control becomes equal to or greater than the allowable reference value Gbt4s for the warning braking, in other words, even if the target deceleration Gbt2 for the warning braking becomes equal to or smaller than the sum of the target deceleration Gbt4 for the automatic travel control and the predetermined value ΔGbt (=Gbt2max−Gbt4s) in a situation where the warning braking is being performed. Therefore, as compared with the case where the warning braking is immediately terminated when the target deceleration Gbt4 for the automatic travel control becomes equal to or greater than the allowable reference value Gbt4s for the warning braking in a situation where the warning braking is being performed, it is possible to prevent the continued time of the warning braking from shortening, which would otherwise result in a failure to effectively execute the warning braking. Thus, it is possible to reliably and effectively issue a warning by means of the warning braking to the crew of the vehicle.

Further, according to the above-described embodiment, as illustrated in FIG. 13, if the target deceleration Gbt4 for the automatic travel control becomes higher than the target deceleration Gbt2 for the warning braking in a situation where the warning braking is being performed, the warning braking is terminated despite the elapsed time Tb from the warning brake start time being smaller than a reference time Tbe. Accordingly, it is possible to issue a warning by means of the warning braking to the driver until the warning braking is terminated. In addition, it is possible to reliably prevent the automatic travel control from being hindered by the continued warning braking.

Further, according to the above-described embodiment, if the warning braking is not performed, despite its need, because the target deceleration Gbt4 for the automatic travel control is greater than the allowable reference value Gbt4s for the warning braking, that is, if a positive determination is made in step 5290, the warning light 46 is blinked, as is the case where the warning braking is executed, whereby a visual warning notifying that the vehicle may collide with the obstacle is issued to the driver, and whereby caution can be given to the driver. Meanwhile, if the warning braking is not performed, despite its need, because the target deceleration Gbt4 for the automatic travel control is greater than the allowable reference value Gbt4s for the warning braking, auditory warning may also be issued in addition to visual warning.

Figure 17:
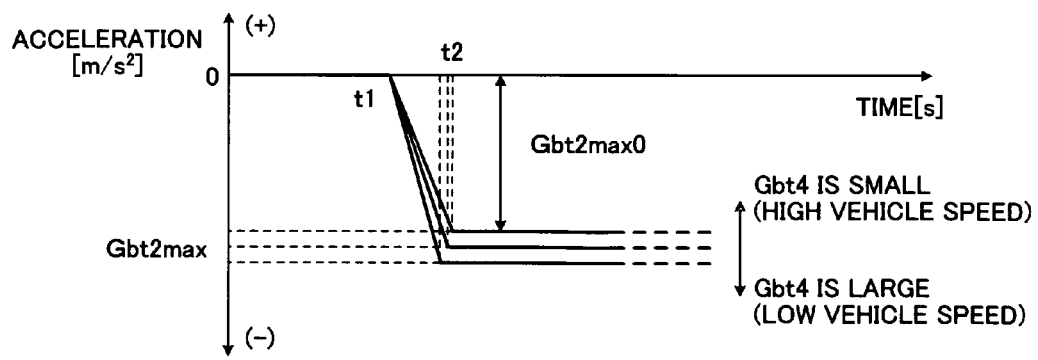
FIG. 17 is a graph showing the relation between the target deceleration Gbt4 for the automatic travel control (vehicle speed V) and the target deceleration Gbt2 for the warning braking.

Further, according to the above-described embodiment, as illustrated in FIG. 17, the maximum target deceleration Gbt2max for the warning braking is variably set in accordance with the target deceleration Gbt4 for the automatic travel control, such that it becomes greater when the target deceleration Gbt4 for the automatic travel control is high, as compared with the case where the target deceleration Gbt4 for the automatic travel control is low. Therefore, it is possible to prevent the vehicle deceleration by means of the warning braking from becoming excessively large when the target deceleration Gbt4 for automatic travel is low. Also, it is possible to effectively issue a warning by means of the warning braking to the crew of the driver by sufficiently changing the vehicle deceleration when the target deceleration Gbt4 for the automatic travel control is high.

Further, according to the above-described embodiment, as illustrated in FIG. 17, the maximum target deceleration Gbt2max for the warning braking is variably set in accordance with the vehicle speed V, such that it becomes smaller when the vehicle speed V is high, as compared with the case where the vehicle speed V is low. Therefore, it is possible to effectively issue a warning by means of the warning braking to the crew of the vehicle by sufficiently decelerating the vehicle when the vehicle speed V is low. In addition, it is possible to effectively prevent the vehicle deceleration by means of the warning braking from becoming excessively large when the vehicle speed V is high.

Further, according to the above-described embodiment, as illustrated in FIG. 2, the target deceleration Gbt2 for the warning braking is set to gradually increase by ΔGb in each cycle until it reaches the maximum target deceleration Gbt2max, to be maintained at the maximum target deceleration Gbt2max until the elapsed time Tb from the start of the warning braking reaches a predetermined value Tbe, and subsequently to decrease at a predetermined decrease rate. In this case, as illustrated in FIG. 9, the per-cycle increase amount ΔGb of the target deceleration Gbt2 for the warning braking is variably set in accordance with the vehicle speed V in step 561, such that it decreases as the vehicle speed V increases.

Therefore, it is possible to effectively issue a warning by means of the warning braking to the crew of the vehicle by increasing the change of the vehicle deceleration by means of the warning braking when the vehicle speed V is low. Also, it is possible to effectively prevent change of the vehicle deceleration by means of the warning braking from becoming excessively large when the vehicle speed V is high.

Further, according to the above-described embodiment, if both the target deceleration Gbt2 for the warning braking and the target deceleration Gbt4 for the automatic travel control assume positive values, the target deceleration Gbt of the vehicle is set to the target deceleration Gbt4 for the automatic travel control before the start and after the termination of the warning braking. Accordingly, it is possible to perform the warning braking while ensuring the effect of the automatic travel control.

In the above, a specific embodiment of the present invention has been described in detail. However, the present invention is not limited to the above-described embodiment, and it will be apparent to those skilled in the art that other various embodiments are possible within the scope of the present invention.

For example, in the above-described embodiment, the target deceleration Gbt4 for the automatic travel control is used as the vehicle deceleration in the warning braking permission determination. However, the actual deceleration Gb (=−Gx) of the vehicle may be used as the vehicle deceleration in the warning braking permission determination.

Further, in the above-described embodiment, the maximum target deceleration Gbt2max for the warning braking is variably set in accordance with the target deceleration Gbt4 and the vehicle speed V in step 533, such that it increases as the target deceleration Gbt4 for the automatic travel control increases and it decreases as the vehicle speed V increases. However, the embodiment may be modified such that the maximum target deceleration Gbt2max is variably set in accordance with either one of the target deceleration Gbt4 and the vehicle speed V only, or set to a constant value irrespective of the target deceleration Gbt4 and the vehicle speed V.

Further, in the above described embodiment, the allowable reference value Gbt4s for the warning braking to be compared with the target deceleration Gbt4 for the automatic travel control in step 515 of the warning braking permission determination routine is a constant. However, the above-described embodiment may be modified such that the allowable reference value Gbt4s for the warning braking is variably set in accordance with the vehicle speed V so that the allowable reference value Gbt4s for the warning braking becomes higher when the vehicle speed V is high, as compared with the case where the vehicle speed V is low.

According to the modification, when the vehicle speed V is low and thus it is difficult for the crew of the vehicle to feel a change in deceleration, the allowable reference value Gbt4s for the warning braking is decreased, to thereby make it difficult to perform the warning braking. As a result, it is possible to effectively prevent the crew of the vehicle from feeling an unnatural sensation due to performance of less effective warning braking. At the same time, when the vehicle speed V is high and thus the crew sensitively feels a change in deceleration, the allowable reference value Gbt4s for the warning braking is increased, making it easy to perform the warning braking. As a result, it is possible to reliably issue a warning by means of the warning braking to the crew of the vehicle.

Further, in the above described embodiment, the allowable reference value Gbt4s for the warning braking to be compared with the target deceleration Gbt4 for the automatic travel control in step 515 of the warning braking permission determination routine is a constant. However, the embodiment may be modified such that the allowable reference value Gbt4s for the warning braking is variably set in accordance with the vehicle speed V so that it becomes higher when the vehicle speed V is high, as compared with the case where the vehicle speed V is low.

Further, variable setting of the maximum target deceleration Gbt2max for the warning braking in accordance with the vehicle speed V or the target deceleration Gbt4 for the automatic travel control (or the vehicle deceleration), and variable setting of the per-cycle increase amount ΔGb of the target deceleration Gbt2 at the time of start of the warning braking in accordance with the vehicle speed V have been described in the above-described embodiment. Such variable setting may be employed in a travel controller of a vehicle which is configured such that when the warning braking is needed in a situation where the vehicle is being decelerated by the automatic travel control, the warning braking is executed, irrespective of whether or not the vehicle deceleration and the target deceleration Gbt4 for the automatic travel control are equal to or greater than respective reference values.

The invention claimed is:

1. A vehicle deceleration controller comprising:
   a braking apparatus that generates braking to decelerate a vehicle at least in response to a vehicle brake being actuated by a vehicle driver;
   a warning braking control unit that controls the braking apparatus to perform warning braking so as to issue a warning to a crew of the vehicle when a decision is made that the warning braking is needed; and
   a travel control unit that controls the braking apparatus to decelerate the vehicle in response to a deceleration request associated with automatic travel control of the vehicle in which vehicle acceleration and deceleration are controlled without the vehicle driver actuating the vehicle accelerator or brake,
   wherein the warning braking control unit makes a comparison between a warning braking reference value determined by the warning braking control unit and a current vehicle deceleration requested by the travel control unit and, even when a decision is made that the warning braking is needed in a situation where the vehicle driver does not actuate the vehicle brake, the warning braking control unit does not perform the warning braking if, based on the comparison, it is determined that the vehicle is being decelerated by the travel control unit and the current vehicle deceleration is equal to or greater than the warning braking reference value.

2. A vehicle deceleration controller according to claim 1, wherein the warning braking control unit starts the warning braking upon detection of a situation where the warning braking is needed and the deceleration of the vehicle is less than the reference value.

3. A vehicle deceleration controller according to claim 1, wherein the warning braking control unit continues the warning braking until a predetermined termination condition is satisfied, even if the deceleration of the vehicle becomes equal to or greater than the reference value in a situation where the warning braking is being performed.

4. A vehicle deceleration controller according to claim 1, wherein the reference value increases as a speed of the vehicle increases.

5. A vehicle deceleration controller according to claim 1, wherein the travel control unit calculates a target deceleration for the travel control of the vehicle and decelerates the vehicle such that the deceleration of the vehicle coincides with the target deceleration, and the warning braking control unit terminates the warning braking when the target deceleration for the travel control becomes greater than the deceleration of the vehicle in a situation where the warning braking is being performed.

6. A vehicle deceleration controller according to claim 1, wherein the deceleration request associated with the travel control of the vehicle is a deceleration request for automatically decelerating the vehicle, irrespective of driving operation by the driver, so as to support the driving of the vehicle by the driver.

7. A vehicle deceleration controller comprising:
   a braking apparatus that generates braking to decelerate a vehicle at least in response to a vehicle brake being actuated by a vehicle driver;
   a warning braking control unit that controls the braking apparatus to perform warning braking so as to issue a warning to a crew of a vehicle when a decision is made that the warning braking is needed, the warning braking control unit computing a target deceleration for the warning braking and decelerating the vehicle such that deceleration of the vehicle coincides with the target deceleration; and a travel control unit that controls the braking apparatus to decelerate the vehicle in response to a deceleration request associated with automatic travel control of the vehicle in which vehicle acceleration and deceleration are controlled without the vehicle driver actuating the vehicle accelerator or brake, wherein the warning braking control unit makes a comparison using the target deceleration and at least a current vehicle deceleration requested by the travel control unit and, even when a decision is made that the warning braking is needed in a situation where the vehicle driver does not actuate the vehicle brake, the warning braking control unit does not perform the warning braking if, based on the comparison, it is determined that the vehicle is being decelerated by the travel control unit and the target deceleration is equal to or less than a sum of the current vehicle deceleration and a predetermined value.

8. A vehicle deceleration controller according to claim 7, wherein the warning braking control unit starts the warning braking upon detection of a situation where the warning braking is needed and the target deceleration is greater than the sum of the deceleration of the vehicle and the predetermined value.

9. A vehicle deceleration controller according to claim 7, wherein the warning braking control unit continues the warning braking until a predetermined termination condition is satisfied, even if the target deceleration for the warning braking becomes equal to or less than the sum of the deceleration of the vehicle and the predetermined value in a situation where the warning braking is being performed.

10. A vehicle deceleration controller according to claim 7, wherein a maximum value of the target deceleration increases as the deceleration of the vehicle increases.

11. A vehicle deceleration controller according to claim 7, wherein a maximum value of the target deceleration decreases as a speed of the vehicle increases.

12. A vehicle deceleration controller according to claim 7, wherein the predetermined value decreases as a speed of the vehicle increases.

13. A vehicle deceleration controller according to claim 7, wherein the travel control unit calculates a target deceleration for the travel control of the vehicle and decelerates the vehicle such that the deceleration of the vehicle coincides with the target deceleration, and the warning braking control unit terminates the warning braking when the target deceleration for the travel control becomes greater than the target deceleration for the warning braking in a situation where the warning braking is being performed.

14. A vehicle deceleration controller according to claim 7, wherein the deceleration request associated with the travel control of the vehicle is a deceleration request for automatically decelerating the vehicle, irrespective of driving operation by the driver, so as to support the driving of the vehicle by the driver.

\* \* \* \* \*